(12) United States Patent
Mancevski et al.

(10) Patent No.: US 10,402,831 B2
(45) Date of Patent: Sep. 3, 2019

(54) THREE-DIMENSIONAL AUTHENTICATION AND IDENTIFICATION METHODS, DEVICES, AND SYSTEMS

(71) Applicant: Authenticate, LLC, Austin, TX (US)

(72) Inventors: Vladimir Mancevski, Austin, TX (US); Paul Frederick McClure, Austin, TX (US); Frank Nicholas Bruno, Austin, TX (US)

(73) Assignee: Authenticate, LLC, Austin, TX (US)

( * ) Notice: Subject to any disclaimer, the term of this patent is extended or adjusted under 35 U.S.C. 154(b) by 0 days.

(21) Appl. No.: 15/899,330

(22) Filed: Feb. 19, 2018

(65) Prior Publication Data

US 2018/0374103 A1 Dec. 27, 2018

Related U.S. Application Data

(63) Continuation of application No. 15/261,717, filed on Sep. 9, 2016, now Pat. No. 9,898,744.

(60) Provisional application No. 62/232,249, filed on Sep. 24, 2015.

(51) Int. Cl.

| | |
|---|---|
| *G06K 19/06* | (2006.01) |
| *G06Q 30/00* | (2012.01) |
| *G06K 19/077* | (2006.01) |
| *G06K 19/10* | (2006.01) |
| *G06Q 10/08* | (2012.01) |
| *H04L 9/08* | (2006.01) |
| *G09C 5/00* | (2006.01) |
| *H04L 9/32* | (2006.01) |

(52) U.S. Cl.
CPC ... *G06Q 30/0185* (2013.01); *G06K 19/06028* (2013.01); *G06K 19/06084* (2013.01); *G06K 19/07758* (2013.01); *G06K 19/10* (2013.01); *G06Q 10/087* (2013.01); *G09C 5/00* (2013.01); *H04L 9/088* (2013.01); *H04L 9/3226* (2013.01); *H04L 9/3247* (2013.01)

(58) Field of Classification Search
USPC .................................................. 235/487–494
See application file for complete search history.

(56) References Cited

U.S. PATENT DOCUMENTS

| 9,650,242 | B2 * | 5/2017 | Cao | ............... | H01L 49/00 |
| 2014/0284382 | A1 * | 9/2014 | Park | ............... | G06K 19/086 |
| | | | | | 235/380 |

\* cited by examiner

*Primary Examiner* — Jamara A Franklin
(74) *Attorney, Agent, or Firm* — Cesari & Reed LLP

(57) ABSTRACT

In some embodiments, an apparatus includes a tag that may include an encapsulant and a plurality of three-dimensional objects randomly oriented within the encapsulant. Each three-dimensional object may include a plurality of characteristics defining at least one statistically unique signature. At least one of the characteristics may be dependent on the orientation of the object. In some instances, the plurality of three-dimensional objects may also be randomly distributed within the encapsulant, and at least one of the characteristics defining at least one statistically unique signature may be dependent on the distribution of the objects.

23 Claims, 21 Drawing Sheets

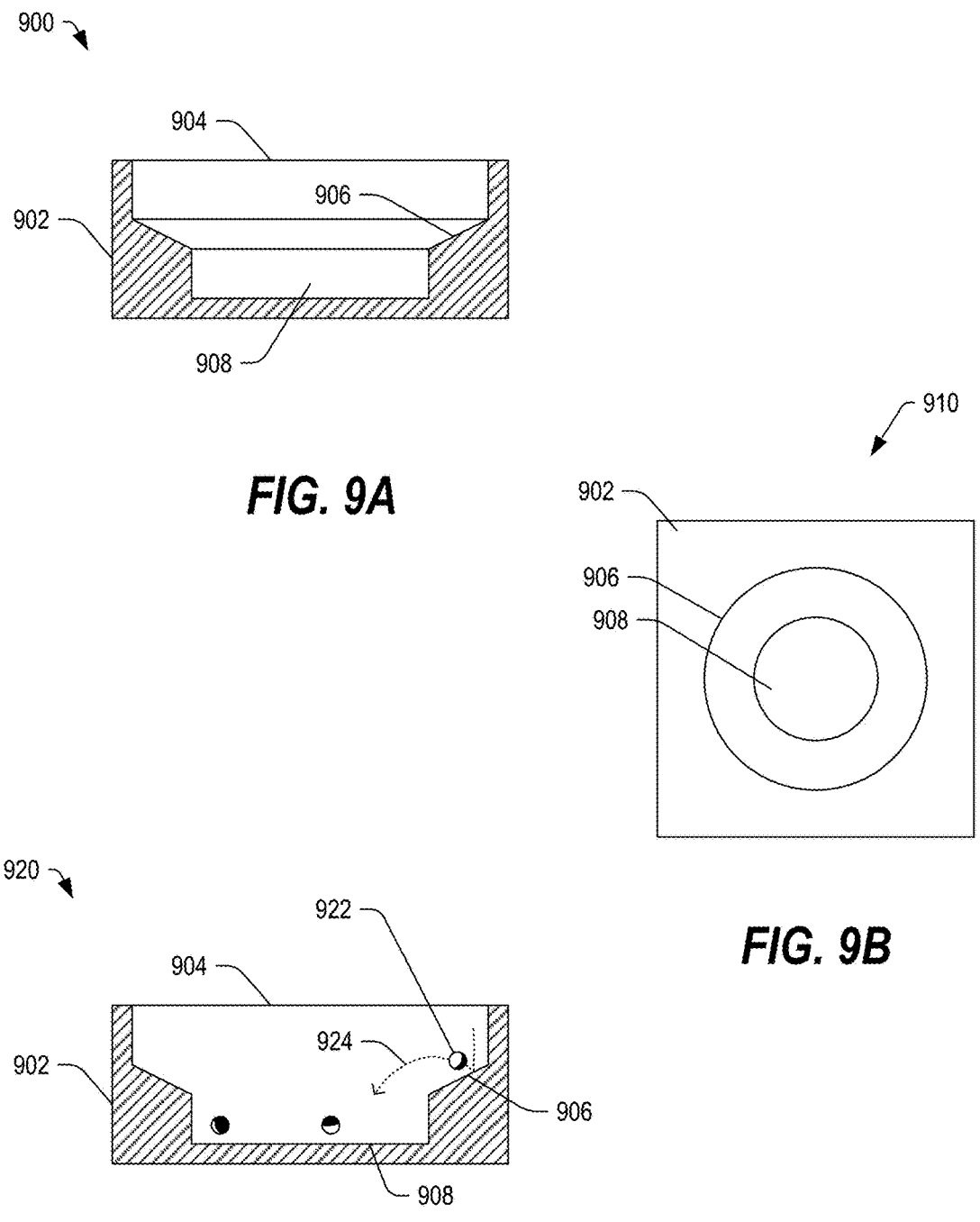

THREE-DIMENSIONAL AUTHENTICATION AND IDENTIFICATION METHODS, DEVICES, AND SYSTEMS

CROSS-REFERENCE TO RELATED APPLICATION(S)

The present application is a continuation of and claims priority to U.S. patent application Ser. No. 15/261,717 filed on Sep. 9, 2016 and entitled "Three-Dimensional Authentication and Identification Methods, Devices, and Systems," which is a non-provisional of and claims priority to U.S. Provisional Patent Application No. 62/232,249 filed on Sep. 24, 2015 and entitled "METHOD, DEVICE, AND SYSTEM FOR AUTHENTICATION AND IDENTIFICATION USING THREE DIMENSIONAL BI-CHROMAL STRUCTURES," both of which are incorporated herein by reference in their entireties.

FIELD

The present disclosure generally relates to three-dimensional authentication and identification methods, devices, and systems. More particularly, the present disclosure generally relates to methods, devices, and systems that utilize three dimensional structures, which may include two or more colors, to provide unique identifiers that can be used for authentication and identification, such as to protect against counterfeiting.

BACKGROUND

Complex global supply chains for mobile phones, computers, printers, automobiles, aircraft, defense systems, medical equipment and other important products are subject to risks and vulnerabilities that enable infiltration of counterfeit goods into legitimate trade channels. Counterfeiting of industrial and consumer products, and components incorporated into these products, can compromise the integrity of final products, generate losses to legitimate businesses and expose consumers to fake, faulty or harmful products.

Existing, widely deployed anti-counterfeiting technologies are subject to various limitations. For example one-dimensional (1D) and two-dimensional (2D) bar codes, holograms, and other optically readable labels and tags themselves be counterfeited (i.e., copied). Radio frequency identification (RFID) tags have raised privacy concerns and also incur a relatively high unit cost, which generally makes them uneconomical for use with high volume, low unit cost products such as active and passive electronic components.

SUMMARY

In some embodiments, an apparatus includes a tag that may include an encapsulant and a plurality of three-dimensional objects randomly oriented within the encapsulant. Each three-dimensional object may include a plurality of characteristics defining at least one statistically unique signature. At least one of the characteristics may be dependent on the orientation of the object. In some instances, the plurality of three-dimensional objects may also be randomly distributed within the encapsulant, and at least one of the characteristics defining at least one statistically unique signature may be dependent on the distribution of the objects.

In some embodiments, an apparatus includes a tag that may include a plurality of three-dimensional objects randomly oriented within an encapsulant. Each three-dimensional object has one or more characteristics that define at least one statistically unique signature.

In other embodiments, an apparatus may include a product and a tag coupled to the product. The tag may include a plurality of three-dimensional objects positioned and randomly oriented within an encapsulant material. The pre-determined number of three-dimensional objects configured to define at least one statistically unique signature.

In still another embodiment, an apparatus can include a product and a tag coupled to the product. The tag may include an encapsulant and a pre-determined number of three-dimensional objects randomly oriented within the encapsulant. The plurality of three-dimensional objects may have a plurality of characteristics detectable to determine at least one statistically unique signature to identify the product.

In still other embodiments, an apparatus can include a product and a tag coupled to the product. The tag may include a plurality of three-dimensional objects randomly distributed within an encapsulant. The plurality of three-dimensional objects may define a respective plurality of random characteristics that can be detected to produce a statistically unique signature.

In one possible aspect, the present disclosure refers to a tag device comprising a prescribed number of randomly oriented three-dimensional objects secured by an encapsulant, which can be attached to a product substrate to provide a statistically unique signature that can be used verify the authenticity of the product. The three-dimensional objects may include bi-chromal objects, magnetic/non-magnetic material objects, electrically conductive/insulative objects, transparent/opaque objects, other dual-property objects, or any combination thereof.

In a second aspect, the tag device may include a tag base that can be made to be an integral part of the product substrate.

In a third aspect, the plurality of three-dimensional objects may refer to an array of spheres or other objects encased in optically clear encapsulant or epoxy, which may be configured to stabilize the objects. The optically clear encapsulant or epoxy may also allow the objects to be imaged.

In a fourth aspect, the three-dimensional objects may be placed into the encapsulant material, which may partially fill a retaining structure configured to constrain the objects.

In a fifth aspect, the three-dimensional objects may include structures that include different characteristics that can vary from object to object. Such characteristics, in either a three-dimensional space or two-dimensional representation, may include but are not limited to diameter, sphericity (a measure of how spherical or round and object is), evenness of the edge separating the two different colors, and the sizes of different colored regions, imperfections in the surface of the object, other variations, or any combination thereof. Further, within a given encapsulant, the unique signature may be determined from the relative spacing between objects, the angular variation between objects or relative to an orientation point, the elevation, the azimuth, the angular orientation, other detectable parameters, or any combination thereof. Any of these detectable variations, alone or in combination, may be used to produce the unique signature.

In a sixth aspect, the present disclosure refers to a tag verification and identification system and the core processes involved in operating the system, as operated in the factory or in the field. In an example, the system may store images of the unique tags or a numerical representation of the images. Further, the system may be configured to receive an image from a remote device, detect a tag in the image, process the tag, and compare the tag signature extracted from the image to tag information stored in a database to determine a match. If a match exists, a product may be verified as authentic. In some instances, an application may execute on a smart phone or other portable computing device that may capture the image and process the image to authenticate the product.

In a seventh aspect the present disclosure refers to exploitation of matching and anti-cloning rules that take advantage of the random arrangement of the three-dimensional objects. Private-key authentication rules can be devised which will defeat a counterfeiter who somehow manages to clone the three-dimensional device, however costly and signature identification rules can be devised which will further enhance the ability of a device signature generated by an imaging system to be matched with a signature stored in a secure database.

BRIEF DESCRIPTION OF THE DRAWINGS

The novel features of this disclosure, both with respect to the structure and operation of the devices, systems, and methods, can best be understood from the accompanying drawings, taken in conjunction with the accompanying description, in which reference characters may be re-used to refer to similar parts.

FIG. 9A depicts an apparatus including a mold material and an impression tool configured to form an imprint in the mold material to provide a conical rim portion, in accordance with certain embodiments of the present disclosure.

FIG. 9B illustrates a top view of the mold material after the imprint is formed, in accordance with certain embodiments of the present disclosure.

FIG. 9C depicts a side view of the mold material including a cavity and including a plurality of three-dimensional objects disposed randomly within the cavity, in accordance with certain embodiments of the present disclosure.

In the following discussion, the same reference numbers are used in the various embodiments to indicate the same or similar elements.

DETAILED DESCRIPTION OF ILLUSTRATIVE EMBODIMENTS

Figure 1A:
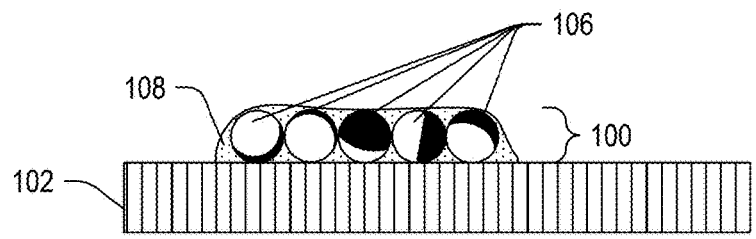
FIG. 1A depicts a side view of a tag including three-dimensional objects that can be coupled to a surface and used for authentication and identification, in accordance with certain embodiments of the present disclosure.

Embodiments of tags are described herein, which may be used to provide stochastically unique optical signatures or identifiers. In certain embodiments, the tags may include two or more three-dimensional objects secured in a transparent encapsulation material. The three-dimensional objects may be dual-property objects, such as objects formed from two or more colors in a selected ratio of coverage. The dual-property objects may include spherical, cylindrical, rectangular, or objects of other shapes. The dual properties may include different colors, different materials, different material attributes (e.g., magnetic/non-magnetic, conductive/insulative, x-ray transparent/opaque, and so on), or any combination thereof. Further, the dual-property objects may exhibit other characteristics, which may include, but are not limited to, diameter, sphericity, evenness of the edge separating the two different colors, sizes of different colored regions, surface imperfections, other characteristics, or any combination thereof. Other detectable characteristics, properties, or attributes may also be used.

In certain embodiments, the three-dimensional objects may include bi-chromal spheres having a first side of a first color (such as white), and a second side of a second color (such as red). Alternatively, the three-dimensional objects may be a dual-property sphere, where one part of the sphere is coated with material that is more or less transparent to X-rays, such as Beryllium and Copper. In another example, the sphere can be formed such that it is partially conductive and partially non-conductive, which can make it easier to image with scanning electron or ion beam microscopes. In another example, the sphere can be partially magnetic and partially non-magnetic, which may make it easier to image with a scanning magnetic microscope. In another example, the dual-property objects can be nanometers in size, for example 1 nm to 300 nm, as long as there is an instrument that can image or otherwise detect the dual-property objects and distinguish between the two or more properties of the object.

In certain embodiments, in the formation of the tags, the three-dimensional objects (such as spheres) may be placed into an uncured encapsulation material, such as a clear epoxy that can be cured by exposure to ultraviolet (UV) light. The three-dimensional objects within the encapsulation material may exhibit a plurality of random characteristics, including variations in the angular orientations and spacing of the three-dimensional objects, physical variations among the objects, and other characteristics can be used to determine a unique identifier (such as an optical signature) from a digital image of the tag.

Embodiments of systems, methods and devices are disclosed herein that may be configured to manufacture and index the three-dimensional objects of a tag, and use the associated randomness of the three-dimensional objects to uniquely identify a product and to authenticate a product (or to detect counterfeit products when the tag cannot be authenticated). In certain embodiments, the tag may serve to deter counterfeiters because they cannot easily place a three-dimensional object (or multiple three-dimensional objects) with exact orientations due to the shape and size of the objects. Further, nearly invisible manufacturing variations between the three-dimensional objects provide stochastic variations that are nearly impossible to reproduce. Thus, only a few three-dimensional objects are needed to make a secure code (a unique signature).

In some embodiments, the manufacturing process for assembling a tag using three-dimensional objects can introduce a high degree of randomness for authentication and identification by taking advantage of the large number of possible orientations of multiple three dimensional objects, such as dual-characteristic spheres. In some examples, a system may propel or place the three-dimensional objects into the encapsulation material to provide variation in the distribution of the three-dimensional objects within the encapsulation material. In other embodiments, the three-dimensional objects may be confined within a particular area producing a geometric arrangement of the three-dimensional objects (such as a 1D array). Even with the confined geometric arrangement, the high degree of randomness in the manufacturing variation and the orientation of the three-dimensional objects make the tag virtually impossible to copy. In some embodiments, by the ordering of the three-dimensional objects in a particular geometric arrangement, the process of determining a unique signature associated with the tag is simplified, and the unique signature can be compared with a signature stored in a secure database to authenticate the product. Other embodiments are also possible.

In the following discussion, the three-dimensional tags are depicted as bi-chromal tags for ease of discussion and illustration. However, it should be appreciated that the three-dimensional objects may utilize other dual-property attributes to produce the three-dimensional tags and to provide the authentication functionality described herein.

FIG. 1A depicts a side view of a three-dimensional tag 100 that can be coupled to a surface and used for authentication and identification, in accordance with certain embodiments of the present disclosure. In some embodiments, the tag 100 may include a plurality of three-dimensional objects 106 encapsulated by a clear encapsulation material 108 which may be coupled to surface, such as a product substrate 102. In certain embodiments, the three-dimensional objects 106 may be made of polyethylene, polypropylene, polystyrene, glass, silica, metal, zirconia, and other similar polymers, ceramics and metals, or any combination thereof. The encapsulation material 108 may be an epoxy that may be cured to form a transparent tag 100.

In some embodiments, the three-dimensional objects 106 may be dropped or placed into uncured encapsulant, and then the combination may be exposed to ultraviolet light, for example, to cure the encapsulant to form the tag. In some cases the encapsulation material 108 configured to secure the spheres 106 is directly coupled to surface, such as a product substrate 102. In some cases, the cured encapsulation material 108 with the encapsulated spheres 106 can be coupled to the product using an adhesive or an epoxy. In a particular example, the epoxy can be formed from the same or a similar material as the encapsulation material 108, and it may be applied at a different time (such as after the encapsulant material 108 is cured to form the tag 100).

In some embodiments, the tag 100 may include an ordered one-dimensional (1D) or two-dimensional (2D) array of a prescribed number of randomly oriented three-dimensional objects 106 within the encapsulant material 108. The ordered array may be formed by placing the objects in a row (to the extent possible). The tag 100 can be attached to a product substrate 102, such as by an adhesive or epoxy, and can be associated with a product identifier (such as a product serial number) to verify the authenticity of the product. Alternatively the tag 100 can be made to be an integral part of the product substrate 102, and the encapsulation material 108 may be used to secure the three-dimensional objects 106 to the product substrate 102.

The three-dimensional objects 106 can be any size that allows them to be imaged optically. For example, the three-dimensional objects 106 may be within a range from 50 to 300 microns in diameter. In certain embodiments, the three-dimensional objects 106 can be very small, such as, for example, 50 to 100 microns in diameter. The small size allows the three-dimensional objects 106 to be incorporated into the tag 100 for authentication of products that are themselves small in size, such as electronic components (e.g., circuits) that are a few millimeters in size. Preferably, the three-dimensional objects 106 are sufficiently small to make it very difficult for a counterfeiter to manipulate and position them a desired orientation. In some embodiments, the diameter of each of the three-dimensional objects 106 of a given tag 100 can vary by as much as 20% from object to object. The variation of the diameters of the three-dimensional objects 106 makes it very difficult for a counterfeiter to find an exact size replica for each of the three-dimensional objects in a tag.

In certain embodiments, the three-dimensional objects 106 may be substantially spherical in shape. Alternatively, the three-dimensional objects 106 may be formed from a polygonal shape, a cylindrical shape, a polyhedral shape, or any other three-dimensional shape that permits any neighboring structures to assume random orientations that are substantially statistically independent from one another. The three-dimensional objects 106 are configured to assume random orientations and random relative spacing when placed into a tag base retaining structure or an encapsulation material (such as an uncured epoxy material), or any combination thereof.

In some embodiments, the surface of each three-dimensional object 106 has dual properties, such as two distinct colors (i.e., it is bi-chromal), where each color covers half of the object 106. In an example where the object 106 is a sphere, each color may cover a hemisphere. Examples of such bi-chromal three-dimensional object are commercially available Janus spheres, such as model number HCMS-BLK-WHT from Cospheric, LLC of Santa Barbara, Calif. In a three-dimensional object 106 having a non-spherical shape, the three dimensional object 106 may be formed of two colors, each covering half of the object 106.

In some embodiments, the ratio of colors of the object 106 may be 50:50, 60:40, 70:30, 80:20, or another ratio, for example. In a bi-chromal three-dimensional object 106, the two distinct colors may be any two colors that can provide sufficient contrast to be distinguished from one another when imaged optically. In one example, the first color may be black, and the second color may be white. In another example, the first color may be red, and the second color may be white, blue, or another contrasting color. Further, in some embodiments, the three-dimensional objects 106 may have different two-color combinations, such red and black, orange and green, white and red, and other color combinations. In still another embodiment, each of the three-dimensional objects 106 may include more than two colors in various ratios. In still another embodiment, each of the three-dimensional objects 106 may have defects on the border between the two colors that can be used as a unique feature. The presence of defects on the three-dimensional objects 106 can make them very difficult for a counterfeiter to replicate.

In some embodiments, the three-dimensional objects 106 may be formed from at least two materials having different material properties. In an example, a portion of the object 106 may be coated with material that is more or less transparent to x-rays, such as beryllium and copper. In another example, the object 106 can be formed such that it is partially conductive and partially non-conductive, which can make it easier to image with scanning electron or ion beam microscopes. In another example, the object 106 can be partially magnetic and partially non-magnetic, which may make it easier to image with a scanning magnetic microscope. In another example, the dual-property objects 106 can be nanometers in size, for example 1 nm to 100 nm, as long as there is an instrument that can image the dual-property objects and distinguish between the two or more properties of the object. Once again, each of the objects 106 may have defects such as on the border between the two materials, which defects can be used as unique features that are very difficult for a counterfeiter to replicate.

The encapsulation material 108 may be formed from a clear epoxy, which may be cured by exposure to ultraviolet light or to another catalyst. In an embodiment, a predetermined number of three-dimensional objects 106 may be encased within the encapsulation material 108, which can keep the array together and protect the array from the environment while allowing the three-dimensional objects 106 to be imaged. Alternatively, the encapsulation material 108 may be formed from a clear thermal epoxy, which may be cured by exposure to heat or curing time (with or without heat).

When the number (N) of three-dimensional objects 106 are randomly placed in or dropped into a 1D or 2D array and when each three-dimensional object 106 is bi-chromal, each object 106 takes on a random azimuth angle and a random elevation angle, as determined in a spherical coordinate system, providing unique tag information. Further, if the tag formation process drops or otherwise distributes the three-dimensional objects 106 randomly, the relative spacing and the angles between the three-dimensional objects 106 in two dimensions or three dimensions adds further unique tag information that can be used to determine a unique tag signature for each tag and to differentiate between tags. Another feature that can be used to determine the uniqueness of each of the three-dimensional objects 106 is their slight variation in diameter. Still another feature that can be used to determine the uniqueness of each of the three-dimensional objects 106 is presence of defects, which may vary from object to object.

In certain embodiments, the tag 100 may be applied to and associated with a product. By imaging the tag 100 and the product during manufacturing or upon application of the tag 100, a unique identifier can be determined for the product, and the unique identifier can be stored in a database of an authentication system. Subsequently, the product may be authenticated by taking a picture of the product and the tag 100 using a digital camera, such as a camera of a smartphone or other computing device, and by communicating data corresponding to the image to the authentication system through a communications network. If the unique identifier is found in the database, the authentication system may communicate data indicating that the product is authentic to the smartphone or other computing device. Otherwise, if the identifier is not found, the authentication system may communicate data indicating that the product may be counterfeit. In some embodiments, such as when the authentication system is not available, software operating on the smartphone or computing device may process the image data to determine a pattern and may authenticate the product based on available information. Other embodiments are also possible.

Figure 1B:
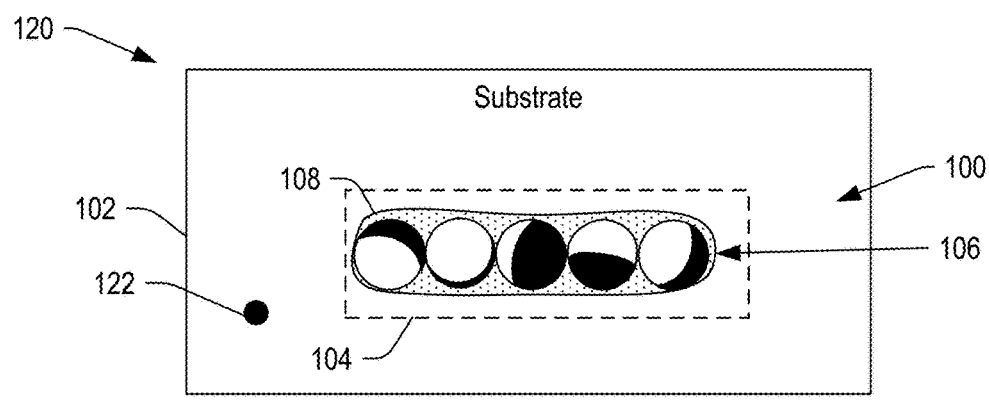
FIG. 1B depicts a top view of the tag of FIG. 1A, in accordance with certain embodiments of the present disclosure.

Referring to FIG. 1B, a top view 120 of a product is shown that includes the tag device 100 of FIG. 1A, in accordance with certain embodiments of the present disclosure. The tag 100 may include a plurality of three-dimensional objects 106 encased by an encapsulation material 108. The tag 100 may be coupled to a substrate 102 of a product. In some embodiments, the tag 100 may be formed on a tag base 104 (shown in phantom), which may be applied to the substrate 102 of a product.

The three-dimensional objects 106 of the tag 100 may be imaged from any direction in which each three-dimensional object 106 is visible. For each imaged direction or from a combination of multiple (two or more) imaged directions, a tag signature may be determined based on the relative or differential orientations of the three-dimensional objects 106, angles between the objects, size variations, defects, other differentiating information, or any combination thereof. In certain embodiments, the imaging direction may be from a top view from which a two-dimensional analog image may be created. The two-dimensional image can represent a unique mapping of the three-dimensional objects based on the direction of the imaging. This unique 2D mapping can be used as a tag signature either in its raw output or after it has been mathematically processed to provide a unique digital code. In certain embodiments, relative orientation of each object 106 may be determined based on the imaged shape of the hemispheres from which the processor may determine an orientation angle of the object 106. Further, the boundaries of each object 106 can be determined based on the imaged shape and the spacing can be determined based on the boundaries. Finally, the hemisphere shapes, spacing, and orientation may be combined to form a unique signature. In some embodiments, the boundary of the encapsulant material 108 may also be determined, and the relative spacing between the objects 106 and the boundary of the encapsulant material 108 may also contribute to the signature.

In a particular embodiment, a number of images may be captured of the tag 100, such as from multiple angles. Subsequently, separate two-dimensional representation of each sphere may be determined from the image data. The image data may then be processed to define signatures. Other embodiments are also possible.

Further, it should be appreciated that the angle at which the image of the tag 100 is obtained may provide different mappings of the three-dimensional objects 106. In an example, a different 2D mapping of the 3D objects 106 can be obtained if the image is captured from a different point of view. The system may automatically determine the perspective angle and may determine if the three-dimensional objects and the tag are, in fact, 3D or just a 2D photocopy of a real 3D tag. Further, the system may be configured to automatically determine, either from off-normal inspection, or from processing of an off-normal image of the counterfeit 2D photocopy of a real 3D tag, that the structures comprising the image are foreshortened in one direction. For example, supposed three-dimensional objects may appear as ellipses rather than as circles in the case of spherical objects, enabling the system to detect the counterfeiting.

Figure 1C:
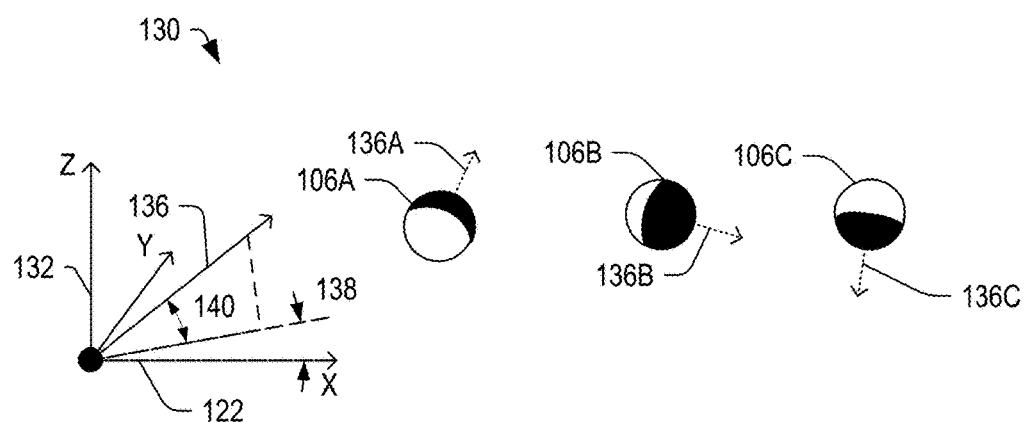
FIG. 1C depicts a view of a plurality of three-dimensional objects, in accordance with certain embodiments of the present disclosure.

FIG. 1C depicts a view 130 of a plurality of three-dimensional objects 106, in accordance with certain embodiments of the present disclosure. In the illustrated example, the orientations of each of the plurality of three-dimensional objects 106 can be determined relative to an X-Y-Z axes 132 having an origin that corresponds to the orientation or alignment mark 122, that corresponds to a point on one of the objects 106, or that corresponds to a centroid of one or more of the objects 106. The X-Y plane of the axis may correspond to the surface of the tag 100 or the substrate 102 of the product. Other embodiments are also possible.

In an embodiment, after the image is captured, the system may utilize a centroid of one of the three 2D images of the spheres as an origin. As for the X-Y axis, the system can use two centroids of the spheres to define an X-Y axis. Thus, the system can compute the origin and the X-Y axis dynamically, making the origin and the axis relative rather than absolute. In a particular example, the system may automatically determine first, second and third spheres, such as based on an index point or other reference or, for example, reading from left to right or vice versa. In some cases, the largest object within the image may be selected as the first one. For cases when the spheres are aligned, as in FIG. 1B, the order can be from left to right or vice versa. In an alternative embodiment, an object may be selected based on its angle being closest to normal as compared to the orientation of the other objects. Other embodiments are also possible.

In the illustrated example, each of the three-dimensional objects 106 is a bi-chromal sphere having an orientation that can be determined by a line extending through a center of the sphere and through a center of one of the colored hemispheres. The line defines a three-dimensional vector 136 having an azimuth angle 138, relative to the X-axis, within the X-Y plane of the vector 136. Further, the vector 136 has an elevation angle 140 in a Z-direction relative to the X-Y plane of the vector 136. Object 106A defines a first vector 136A; object 106B defines a second vector 136B; and object 106C defines a third vector 136C. In some embodiments, the vector may be defined based on a line extending between centroids of two selected objects. Other embodiments are also possible.

In the illustrated example, a camera may capture an image of the plurality of objects 106. A processor coupled to the camera may process the image to determine the vector 136 for each object 106. Further, in some instances, the processor may calculate other data from the image, such as a spacing between objects, a spacing between the object and a boundary of the cured encapsulant material, a difference between adjacent vectors, other characteristics, or any combination thereof, and the processor may use such data from the image to determine a signature for each object, for the tag, or any combination thereof. In a particular embodiment, the processor may take advantage of the fact that the spheres have random orientations, which defines a plurality of characteristics that can be used to define a signature. In a particular example, the characteristics can include a centroid location, an area moment of inertia, and other common image processing features. Further, the characteristics can include variations in the sizes, shapes, or other physical aspects of the objects. It should be appreciated that the characteristics can be defined by the random sphere orientations, and the unique signature generated therefrom may take into account the sphere orientations as well as other characteristics.

In certain embodiments, the randomness of the orientations of the various objects 106, their relative spacing, size differences, imperfections in the objects (color variations, color ratios, irregular lines of demarcation between the colors, other imperfections, or any combination thereof) may be detected to provide a unique signature, which may be used to authenticate products and determine counterfeits. Such products can include integrated circuits, electronic devices, wearable items (such as clothing, hats, and so on), protective covers, packaging materials (such as cardboard boxes, glass bottles, plastic bottle, and so on), medicine bottles, and so on. In certain embodiments, the objects 106 may be formed from an edible and food safe substance, such as a medicinal coating for a caplet, in which case the objects 106 may be applied to pills or other edible items and can be used to verify authenticity.

Figure 2:
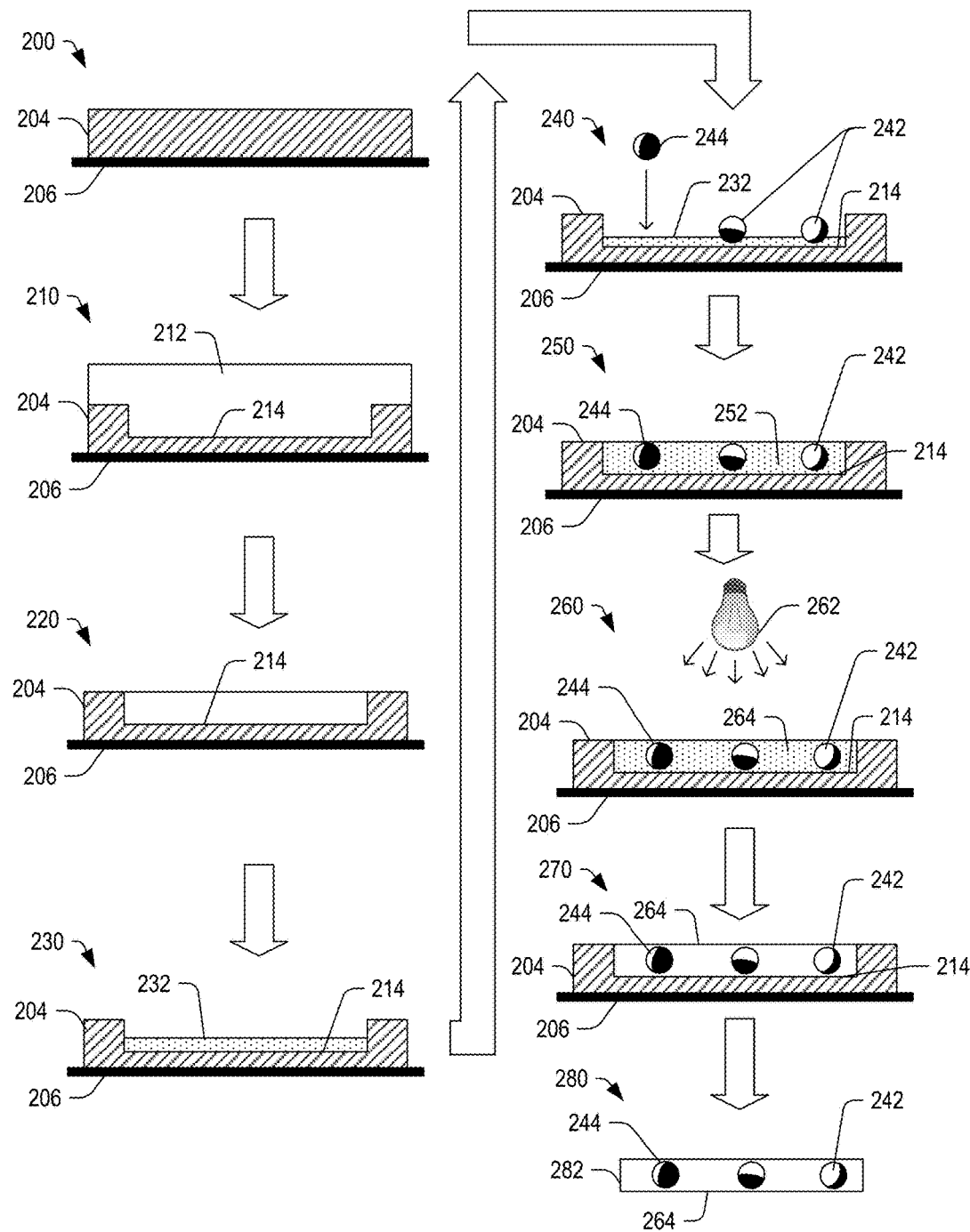
FIG. 2 depicts a partial block diagram and partial flow diagram of a method of producing a tag including three-dimensional objects, in accordance with certain embodiments of the present disclosure.

FIG. 2 depicts a partial block diagram and partial flow diagram of a method of producing a tag including three-dimensional objects, in accordance with certain embodiments of the present disclosure. At 200, the method may include depositing a material 204 on a substrate 206, where the material is capable of receiving an impression or is capable of being imprinted to form a shape within which a tag may be formed. In some embodiments, the material 204 may be formed from an impressionable material, such as a wax. In an alternative embodiment, the material 204 may be formed from machinable material, such as Teflon, silicon, metal, wood, or another material that can be carved, drilled, etched, or otherwise machined. In an alternative embodiment, the material 204 can be initially heated so as to enable an impression to be formed.

At 210, the method may include forming an impression 214 in the material 204. The imprint may form a well in the material 204. In an example, the impression 214 may be formed using an imprint tool 212. In some embodiments, the imprint tool can be mounted on a rigid support that is kept vertically aligned. The imprint tool can be held motionless while previously heated material 204 cools to a temperature at which the impression remains. In another embodiment, the impression 214 may be formed through etching, machining, drilling, or another method or device.

At 220, the method may include retracting the imprint tool 212. Retraction of the imprint tool 212 exposes the well or impression 214. If other materials are used, the method at 220 may include cleaning or otherwise removing excess material in order to expose the impression 214. In some embodiments, the method may also include exposing the impression 214 to ultraviolet light, ionization source or to a ground to reduce or eliminate any static charge.

At 230, the method may include filling the formed impression 214 with an encapsulation material 232, such as an ultraviolet-curable epoxy. In some embodiments, as shown, the impression 214 may be partially filled with encapsulation material. In some embodiments, the encapsulation material may be cured by exposure to ultraviolet light, for example. After curing, three-dimensional objects may be dropped or placed in the impression on the encapsulation material. More encapsulation material may be added to fill the impression 214, and then the encapsulation material may again be exposed to ultraviolet light to cure the material. In certain embodiments, the encapsulation material 232 may be configured to receive the three-dimensional objects prior to UV curing, as shown at 240.

At 240, the method can include placing or dropping randomly-oriented, three-dimensional bi-chromal objects 242 and 244 into the ultraviolet-curable encapsulant material 232. In the illustrated example, the object 242 is already in contact with the encapsulant material 232, while the object 244 is still dropping or being placed. In some embodiments, the 3D objects 242 and 244 may be three-dimensional bi-chromal objects, such as Janus balls. Further, in some embodiments, the three-dimensional bi-chromal objects can be made of material that can withstand temperatures encountered during soldering. In some embodiments, the three-dimensional bi-chromal objects can be colored as a result of painting, coating or deposition with materials that have contrasting colors. Further, in some embodiments, the three-dimensional bi-chromal objects can contain material which is luminescent when exposed to light with particular wavelengths. In still other embodiments, the three-dimensional bi-chromal objects can be fabricated using photolithography.

At 250, the method may include adding additional encapsulant material 252. In certain embodiments, the additional encapsulant material 252 may be added to cover each of the 3D objects 242 and 244. Other embodiments are also possible. In some embodiments, the method may omit step 230. Further, in some embodiments, steps 240 and 250 may be reversed in which case randomly-oriented, three-dimensional bi-chromal objects 242 and 244 are first placed into the into formed impression 214, after which the formed impression containing the three-dimensional bi-chromal objects can be filled with ultraviolet-curable encapsulant (or epoxy) 232. In still another embodiment, the impression 214 may be filled with encapsulant material 252 and then the three dimensional objects 242 and 244 may be placed in the encapsulant material 252. Other embodiments are also possible.

At 260, the method may include exposing the encapsulant material 252 to ultraviolet (UV) light from a UV light source 262, producing cured encapsulant 264. In some embodiments, the irradiation time can be five (5) minutes or another amount of time, depending on the cure time of the encapsulant and the thickness of the encapsulant layer. In certain examples, the encapsulant material 252 may include a UV curable epoxy that, when exposed to UV light, may cure and solidify to secure the 3D objects 242 and 244. In some embodiments, the method may include irradiating the encapsulant material 252 with sufficient UV light to produce cured encapsulant material 264. In some embodiments, the system may include multiple UV light sources configured to irradiate the encapsulant material 252 from multiple directions. In certain embodiments, the ultraviolet-cured epoxy containing the three-dimensional bi-chromal objects can be referred to as a tag or tag device.

At 270, the method may include inspecting the tag. In an example, the tag may be presented to an optical imaging device, which may capture one or more images of the tag. In the event that a tag is flawed (e.g., includes fewer 3D objects than desired, or has a different flaw that may interfere with the generation of a unique signature from an image of the tag), the tag may be removed and discarded.

At 280, if the tag passes the inspection (at 270), the method may include removing the tag 282 from the formed impression 214. The tag may be added to an inventory of tags. In some embodiments, the tag may be referred to as a puck.

It should be appreciated that the embodiment of the method depicted in FIG. 2 is illustrative only and that variations in the method of forming the tag or puck may be made without departing from the scope of this disclosure. In a first example, an imprint can be formed, and the imprint or well may be filled with an encapsulant material, such as an epoxy. The three-dimensional objects may be dropped or placed in the encapsulant material, and the resulting object may be cured by exposure to ultraviolet (UV) light, for example. In another example, the imprint may be made and then partially filled with encapsulant material. The encapsulant material may then be cured, such as by exposing the encapsulant material to UV light. The three-dimensional objects may be placed or dropped into the well onto the cured encapsulant material. More encapsulant material may be added to fill the impression and the encapsulant material may be cured by exposure to UV light.

In another embodiment, the imprint may be made and then partially filled with encapsulant material. The three-dimensional objects can then be dropped or placed into the encapsulant material. The resulting object may be exposed to UV light to cure the encapsulant material. Then, more encapsulant material may be added and exposed to UV light to cure the encapsulant material to form the tag. In another example, the imprint can be formed and the three-dimensional objects may be dropped or placed in the imprint. Then the imprint or well (including the three-dimensional objects) may be filled with encapsulant material and cured by exposure to UV light to form the tag. Other embodiments are also possible.

In the illustrated example of FIG. 2, the tag is shown in a side view, and appears to be rectangular in shape. However, in certain embodiments, the puck may be cylindrical, elliptical, rectangular, or another shape.

Figure 3A:
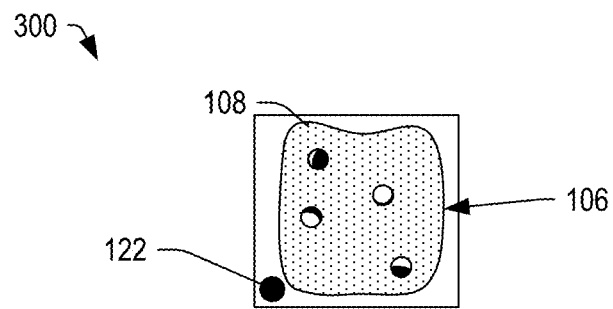
FIGS. 3A-3B depict arrangements of three-dimensional objects in a tag, in accordance with certain embodiments of the present disclosure.

Referring to FIG. 3A, the bi-chromal spheres comprising a device can be arranged in a square (or rectangular) configuration in a 2D array. In the illustrated example, the tag 300 may include a plurality of three dimensional objects 106 encapsulated within a cured encapsulant material 108. In some embodiments, the tag 300 may include a tag base or may be mounted to a substrate, either of which may include an orientation or alignment mark 122. In this example, the tag 300 includes four randomly placed bi-chromal spheres or objects 106 from which a unique signature may be determined.

Figure 3B:
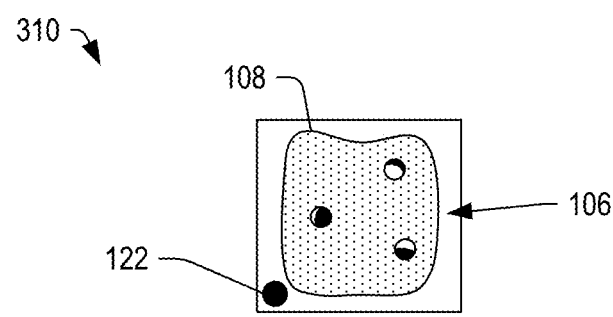

Referring to FIG. 3B, a tag 310 is shown that includes the bi-chromal spheres 106 arranged in a triangular configuration in a 2D array. In this example, the tag 310 includes three bi-chromal spheres 106, which can be randomly placed or dropped into the UV curable encapsulant 108. In this example, the triangular arrangement (i.e., spacing) and the orientation of the spheres 106 can be used to produce a unique signature.

In addition, the spheres 106 can be arranged in a hexagonal configuration or in another configuration. In some embodiments, in addition to a hexagonal, circular, or other configuration of the spheres 106, an additional sphere 106 can be positioned in the middle of the other spheres 106. In some embodiments, the tag may be formed within a circular retaining structure of a given diameter, or any other pattern that is practical for the design of the tag 100.

In some cases where the value of the product that has to be authenticated is very high, one can use an array of 10×10 bi-chromal spheres, or an array of 100×100 bi-chromal spheres, and even an array of 1000×1000 bi-chromal spheres. The tag device may have an alignment mark as shown in FIGS. 3A and 3B, but does not have to have a separate alignment mark. Instead strategic positioning of one or more spheres with respect to the tag base can be used to identify the number one position in the array.

Figure 4A:
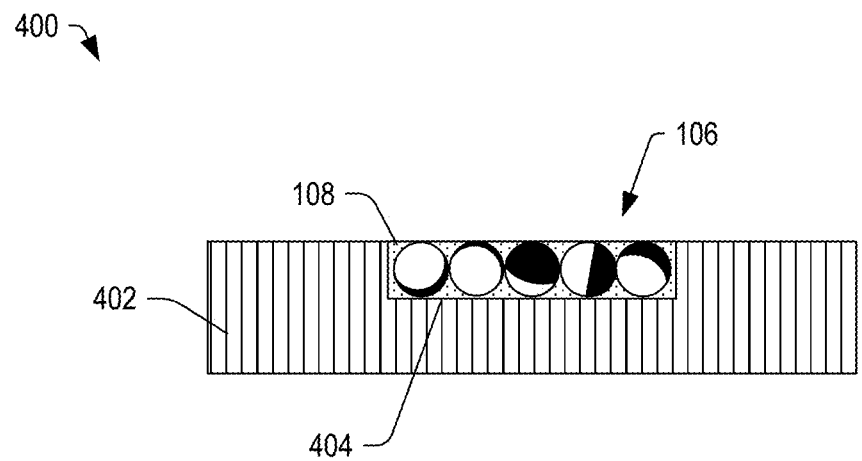
FIG. 4A shows a side view of a retaining structure for the tag including compactly packed three-dimensional objects, in accordance with certain embodiments of the present disclosure.
Figure 4B:
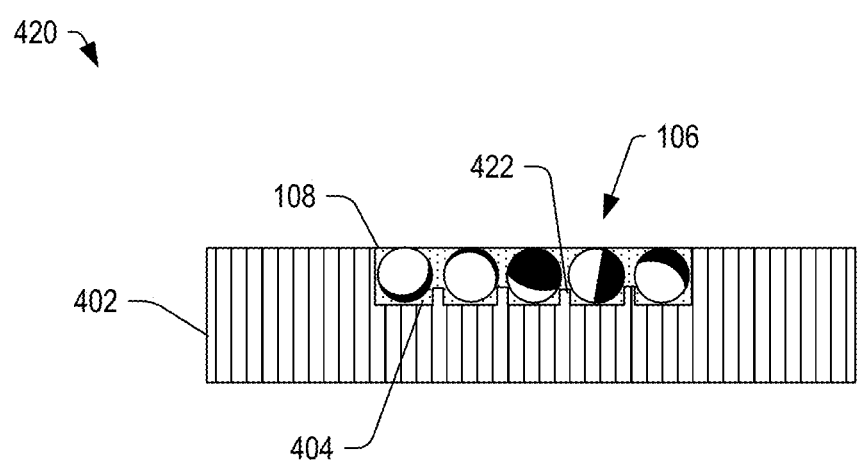
FIG. 4B depicts a side view of a retaining structure for the tag and including spacers to separate the three-dimensional objects, in accordance with certain embodiments of the present disclosure.

Referring to FIGS. 4A-4B, the spheres 106 comprising a tag device 400 may be placed into a retaining structure 404 of a substrate 402. In general, a retaining structure 404 of any shape can be used so long as it constrains the spheres 106. In some instances, the retaining structure 404 can constrain the spheres 106 to align themselves in an array, which remains fixed until the spheres are permanently fixed with a UV curable encapsulant, such as an epoxy, or by any other means.

For example, FIG. 4A illustrates a retaining structure 404 in the shape of a rectangular depression within a substrate 402 that forces tight formation of a 1D array of spheres 106, which can be secured in a UV curable encapsulant 108 to form a tag 400. The sidewalls of such a retaining structure 404 can be made with just enough clearance to constrain the array of spheres 106. In this example, it is possible that edges of the retaining structure 404 can create line artifacts in the image used to generate the device signature. Although, such line artifacts can be eliminated with image processing, this effect can be also avoided by modifying the design of the retaining structure 404. For example, the line artifacts can be reduced or eliminated by tapering the sidewalls of the retaining structure 404 in such a way that the sidewalls appear separated from the structures when viewed top down. Another solution includes rounding the edges so as not to produce sharp contrast in a top down image.

In the illustrated example, the sidewalls of the retaining structure 404 and the encapsulant cover the spheres 106 in a flush or tight configuration. However, the sidewalls do not have to cover the spheres 106 exactly. In some embodiments, the sidewalls of the retaining structure 404 can be deeper that the diameter of the spheres 106. Alternatively, the sidewalls of the retaining structure 404 can be a fraction of the diameter of the spheres 106.

In another example, FIG. 4B illustrates a retaining structure 404 in the shape of a rectangular depression with spacers 422 at the bottom that allow the spheres 106 to fit without touching each other. By spacing the spheres 106, the image analysis is simplified. In particular, when the spheres 106 contact one another, the image analysis can be complicated by imaging conflicts where the color is the same for both spheres 106 in the contact area. The spacers 422 can be concave walls, triangular groove, rectangular bars (as shown), or cut holes that fit the sphere 106 without letting it pass through. Other embodiments are also possible.

In one embodiment, once the spheres 106 have either been placed on a tag base (with or without a retaining structure), the spheres 106 can be potted with a clear material, which hardens over time or with exposure to UV light or another catalyst. In an example, the clear material may include an optically clear epoxy, which may be configured to maintain the structural integrity of the tag while still permitting tag (and the spheres 106) to be imaged for the purpose of generating a device signature.

When used for product identification and authentication, the tag can either be fabricated separately as a stand-alone tag (with or without a tag base) which can be subsequently affixed to a product, or fabricated in place on the surface of the product itself. This choice may depend on the nature of the product, its size and other factors. In one example, the tag may be fabricated within or placed into the "Pin 1" indicator marking on an integrated circuit.

The three dimensional objects or 3D spheres 106 can have random analog azimuth and elevation angles. In accordance to the natural real numbers set, the set of spheres 106 may have infinitely many azimuth and elevation angles. However, the 2D images of the 3D spheres 106 can have a finite set of azimuth and elevation angles, depending on the resolution of the imaging system. For example a camera with 600×600 pixel resolution produces a lower resolution image of the spheres 106 than a camera with 960×1280 pixels resolution (1 Mega Pixels camera). The imaging system may therefore have some finite spatial resolution, which will enable a set of characteristics that may be quantitative, qualitative or both. The various characteristics may be extracted using an image processing algorithm to determine characteristics unique to each sphere 106 and to the array of spheres 106.

As an illustrative example, the spatial resolution of the imaging system may be configured to discern variations of approximately 10 degrees in either the azimuth angle or the elevation angle of an individual sphere. In this example, a different set of characteristics be extracted from the image for each 10 degrees in either the azimuth angle or the elevation angle of an individual sphere 106. Accordingly, the number of distinct sets of characteristics associated with an individual sphere can be approximately 36, corresponding to distinct values of the azimuth angle and some number which may be less than 18 (for example 15), corresponding to distinct values of the elevation angle, taking account of the increased difficulty of distinguishing elevation angles close to ±90 degrees.

In certain embodiments, the azimuth and elevation angles of each sphere 106 are statistically independent, since either angle can take on its entire range of possible values for any particular value of the other angle. The number of possible combinations of azimuth and elevation angle in the case of the illustrative example is therefore 36×15=540 for each sphere 106. Further, to the extent that a line connecting the centroids of two spheres defines an axis, the orientations may be determined relative to the line, introducing another element of randomness. The number of possible combinations of characteristics extracted from the image will be approximately the same, i.e., 540 in the case of the illustrative example.

If the tag comprises 5 different spheres 106, then the number of possible number of different sets of characteristics extracted from the image will be 540 raised to the power 5, which is equal to 4.6 times 10 to the 13th power ($4.6 \times 10^{13}$). This illustrative example teaches that the number of different sets of characteristics that can be extracted from an image of a tag comprising a relatively small number of structures, such as five (5), produces a statistically unique signature. In an example, the number of possible variations can be so large that it would be extremely unlikely that any two devices manufactured with randomly oriented structures would produce matching images. Further, in addition to the orientations and elevations of the spheres, size differences, imperfects, variations in the color coverage, and various other measurable features may also be used to produce a statistically unique signature.

As used herein, the term "signature" or "device signature" refers to the set of characteristics (or representations) of each three-dimensional object and of the object relative to a set of three-dimensional objects determined from an image of the device or tag. In some instances, the signature or device signature may be determined by processing one or more of the characteristics to determine a unique signature. For example, such characteristics can include (a) computed azimuth and elevation angles of each sphere, (b) the orientations of respective geometric shapes appearing as features in the image (such as crescent shapes, hemispherical shapes, and so on), (c) the area of the respective geometric shapes appearing as features in the image, (d) the ratios between the bi-chromal color distributions of each sphere within the image, (e) the results of a comparison of each geometric shape appearing in the image to those of other geometric shapes appearing in the image, (f) area moments or products of inertia associated with geometric shapes appearing as features in the image, (g) the percentage of color in the image of the tag or the individual sphere, (h) other quantitative or qualitative characteristics which may be extracted using a standard or custom image processing algorithm, or any combination thereof. In some embodiments, the Euclidean distance and the angular relationship between spheres 106 of the tag may be determined from the geometric shapes in the image and may be used as part of the signature. In a particular embodiment, the aforementioned list may also be applied to three dimensional objects from which the two-dimensional representation is created. Further, in addition to the above-list, the system may be configured to analyze the image generated from a tag comprised of three-dimensional objects to produce a matrix of pixel values representing the presence or absence of objects. In still other embodiments, in addition to the above examples, the system may analyze the image voxels, the relative angles between objects, the spacing between objects, the centroid of a group of objects, or any combination thereof.

In some embodiments, the various characteristics may be used as coefficients within an algorithm to produce a real number within a range from 0 to n, where the real number represents the optical data as a statistically unique signature. Alternatively, the various characteristic values may be used to produce an integer number from 0 to i, where the integer number (i) is determined by the resolution with which a signature parameter can be extracted from the image. In some embodiments, the real number (n) can be digitally binned in one of the integer number (i) bits. For example, in accordance to the above example where the image resolution was 10 degrees in either the azimuth angle or the elevation angle of an individual sphere, the integer number (i) would be 36. In a further example, an actual azimuth angle of 9.9° would be registered as 10 and an azimuth angle of 22.3° would be registered as 20. Other embodiments are also possible.

A counterfeiter who attempts to manufacture a replica of the tag will find that it is extremely difficult to correctly reproduce the three-dimensional orientation of each of the spheres, which may range from 1 to 300 microns in diameter. This type of tag may discourage counterfeiting, since counterfeiting is generally not economically feasible if the cost of counterfeiting a product exceeds the value of the product itself, which may be a few cents in the case of many electronic components. In this case, the level of precision required to reproduce a counterfeit tag may increase the cost of the tag to be many times more than the product itself.

Nevertheless, to still further increase the difficulty of manufacturing a near-replica of the three dimensional device, the spheres used to fabricate the tag device may be selected from a plurality of spheres that includes structures with slightly different characteristics, which may include but are not limited to diameter, sphericity, evenness of the edge separating the two different colors, the sizes of different colored regions, and other variations or imperfections. Such characteristics may vary due to limits of manufacturing tolerances. The means and standard deviations associated with variations of this kind have little or no effect on the ability of an imaging system to generate the same signature for repeated imaging of the same device. In fact, each statistically independent defect or imperfection of the spheres will add more unique characteristic values, which can inform signatures of the spheres in the tag. Such use of characteristic variations would require the counterfeiter to not only replicate the three-dimensional orientation and spacing of each of the 200 to 300 micron-size spheres, but also to reproduce or find the structures with the same variations of different characteristics, and place them in the same sequence and orientation as the original device.

Figure 5A:
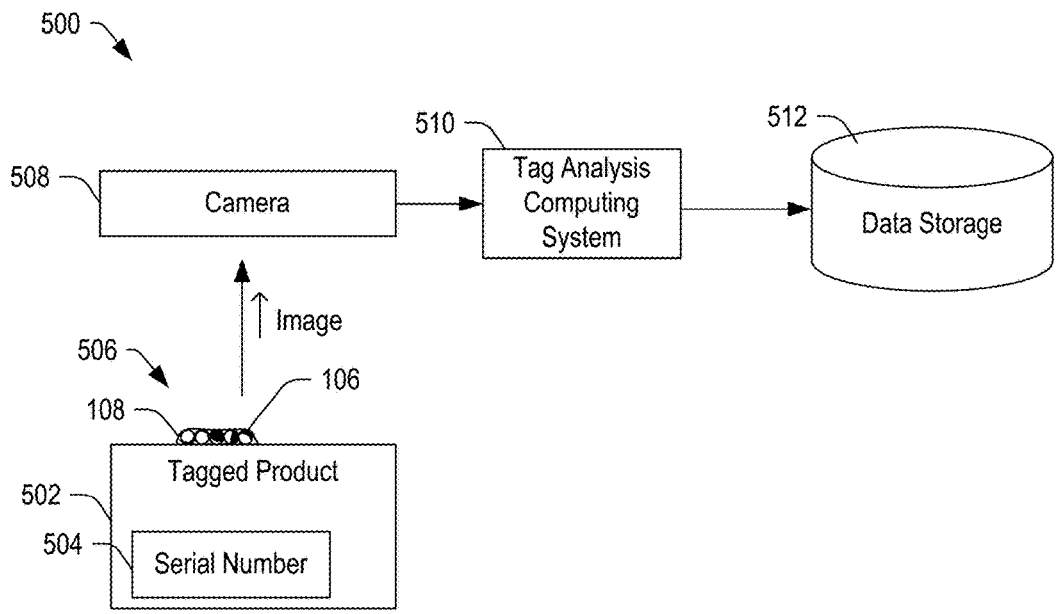
FIG. 5A depicts a block diagram of a system for authentication and identification of a product by a manufacturer using the tag, in accordance with certain embodiments of the present disclosure.

FIG. 5A illustrates one embodiment of a tag verification and identification system 500 and the core processes involved in operating the system, as operated in the factory. In one variation, a tag 100 including a plurality of bi-chromal spheres 106 has been fabricated separately and attached to a product 502 with a serial number 504 at the factory. In another variation, the tag 100 with the plurality of bi-chromal spheres 106 has been fabricated directly onto the product 502 at the factory. In either case, the product's serial number 504 can be associated with the signature of the tag that will be generated. If the product 502 does not have a serial number, a lot number can be assigned that is valid for all the products in the lot. The number of products in a lot can be anywhere from 100 to 10,000 and sometimes as many as 100,000. In some embodiments, a bar code or other serial number may be printed on or etched onto encapsulant material 108, such as where the product is too small to have a separate bar code.

The system 500 may include a camera 508, a tag analysis computing system 510 coupled to the camera 508, and a data storage 512 (such as a database) coupled to the computing system 510. The camera 508 may be configured to capture a photo of each of the tags 100 from top down point of view while the products 502 are moved by a conveyer belt or by any other method. In certain embodiments, the camera 508 may include magnification optics of 20× to 100×. The magnification of the camera 508 can depend on the size of the bi-chromal spheres. In one embodiment, the spheres 106 can be in the range of 200 to 250 microns in diameter. In another embodiment, the spheres 106 are in the range of 100 to 125 microns. In yet another embodiment, the spheres 106 can be as small as 40 microns in diameter. In certain embodiments, the magnification of the camera 106 may be 200× to 500×, which can be used for imaging the smallest bi-chromal spheres 106. In certain embodiments, the camera 508 can be a digital imaging device with a Universal Serial Bus (USB) style connection to the tag analysis computing system 510. One example of such digital camera is model acA2040-90uc by Basler AG of Germany. In an alternative embodiment, the camera 508 can be analog with image data acquisition card configured to digitize the image. The photo captured by the camera 508 can be sent to the tag analysis in a digital form.

A tag analysis computing system 510 (or other image processing system) can be used to analyze the unique signature of each bi-chromal sphere 106. The tag analysis computing system 510 may be a laptop computer that is connected to the digital camera with USB style connection. In some cases the tag analysis computing system 510 can be a desktop computer or a tablet. In some embodiments, the tag analysis computing system 510 includes image processing software that takes the digital image from the camera and processes the image to characterize the uniqueness of each of the spheres 106 in the tag or the uniqueness of the set of spheres 106 in the tag. One example of such image processing software is the NI Vision Development Module by National Instruments. In some embodiments, multiple signatures may be determined from a single image to characterize the uniqueness of each sphere 106. Therefore, a set of three real numbers (n), corresponding to the three signatures, can uniquely define each sphere 106, and a set of fifteen (15) real numbers can uniquely define the tag 100. A mathematical algorithm can be used to associate the set of fifteen (15) numbers with the serial number 504 of the product 502, encrypt that information, and store the information in a data storage 512, which may be a hard drive on a desktop or a laptop, or may be a secure cloud based server that can be accessed securely from anywhere in the world via the Internet. The level of security provided by a tag 100 may be influenced by the number of spheres used as well as by adjusting the number of characteristics or features determined for each sphere 106. For example, if the system uses only the size of colored region for each of the 3 spheres, then the system can determine one signature per sphere or three (3) total signatures. However, if the system uses the size of the colored region and the areal moment of the image and the sphere diameter, for example, then there are three (3) signatures per object 106 or nine (9) total signatures for a set of three (3) spheres. For example, a more secure tag 100 can utilize ten (10) bi-chromal spheres 106 and determine five (5) unique characteristics for each sphere 106 from a single measurement (i.e., a single image).

In certain embodiments, the computing system 510 may be configured to detect patterns from the arrangement of objects, from the orientations of the objects, and from minute variations in the various objects. The patterns may be used as unique signatures. Alternatively, the computing system 510 may further process the patterns to produce unique signatures.

It should be appreciated that the camera 508 is used because the dual-property aspect of the three-dimensional objects (spheres) 106 is optical (bi-chromal). In other embodiments, where the objects (spheres) 106 are formed from two different materials having different electrical properties, the camera 508 may be replaced with suitable equipment for determining the orientation of the objects (spheres) based on the material property.

Figure 5B:
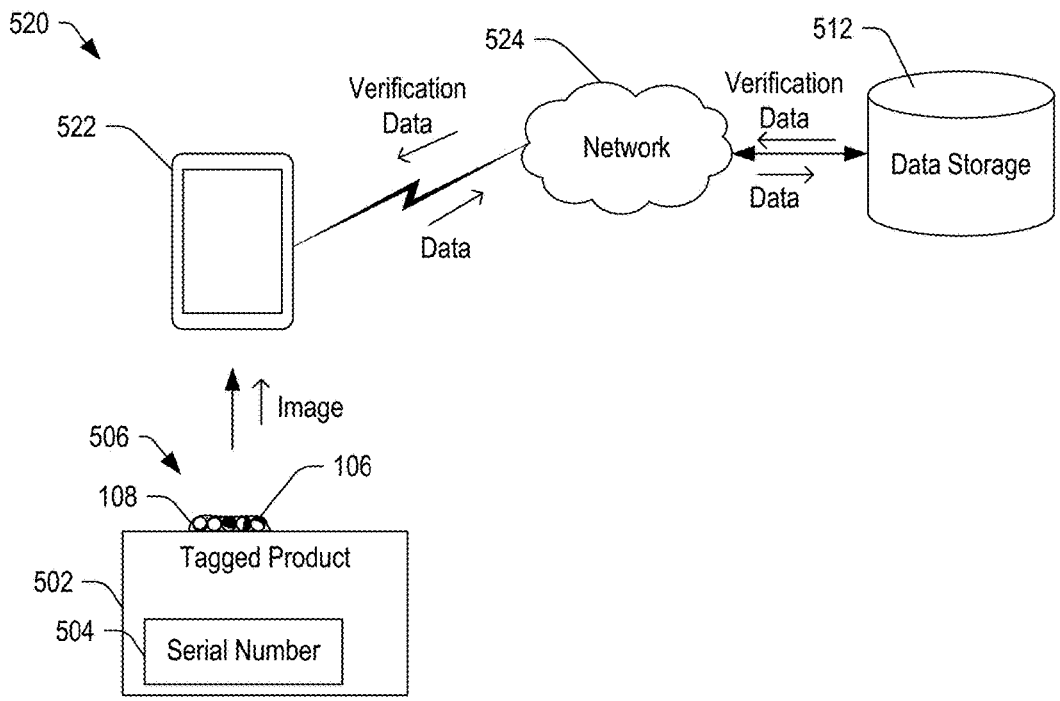
FIG. 5B depicts a block diagram of a system for authentication and identification of a product by a user based on the tag, in accordance with certain embodiments of the present disclosure.

FIG. 5B depicts a block diagram of a system 520 for authentication and identification of a product 502 by a user based on the tag 100, in accordance with certain embodiments of the present disclosure. In this embodiment, the user in the field would need to have a camera, a processing capability, and network access, such as access to the Internet, to communicate with the secure cloud where the tag information is stored.

The system 520 may include a computing device 522, such as a smart phone, tablet, or laptop computer, which may include a camera. The computing device 522 may be configured to communicate with the data storage 512 via a network 524. In some embodiments, the computing device 522 may include an enhanced camera or may be coupled to a camera device, such as an optical microscope attachment, to image the bi-chromal spheres 106 with sufficient resolution to encode the tag 100 correctly. In some embodiments, the camera may be an external camera that is coupled to the computing device 522 by a USB cable.

In certain embodiments, a user may interact with an application executing on the computing device 522 to capture the image of the bi-chromal objects 106. In certain embodiments, the application may guide the user to capture an image from above (i.e., top down), or from nearly top down, so as to create a two-dimensional mapping of the bi-chromal objects. In some instances, using orientation sensors within the computing device 522, the computing device 522 may assist the user in achieving a substantially horizontal orientation of the camera relative to the product 502. Since the tag 100 is a 3D object, the application can determine the angle at which the image is captured or may control the camera to prevent image capture at angles that vary from (normal or orthogonal relative to the surface of the product 502) by more than a threshold amount. In some embodiments, a camera image with slight variation from the normal direction may produce unique signature features that are similar to the signature features for an image taken from the normal direction. Within an acceptable range of image capture angles, the unique signature features in the image can be determined for all of the spheres 106. Thus, the camera image does not have to be taken from a strictly defined angle to achieve a match with the tag information stored in the data storage.

In certain embodiments, the application running on the computing device 522 may prompt a user to input a serial number of the product or the lot number of the set of products into a field of the application. The computing device 522 may then process the image in a manner similar to the process executed during manufacturing to determine the "signatures" or "device signatures" extracted from the image of the device by using an image processing algorithm. In certain embodiments, the computing device 522 may process the image to determine three real numbers corresponding to three unique characteristics for each sphere, or the fifteen (15) real numbers for a tag with five (5) spheres. The application may cause the computing device 522 to encrypt the set of real numbers and the serial number of the product and may communicate the encrypted data to a system including the data storage 512. The system may compare the encrypted data to data stored in the data storage 512.

In an alternative embodiment, the computing device 522 may send raw image data to a system including the data storage 512. The system may then perform analysis on the raw image data and process the raw image data against images stored in the data storage 512. If a match is determined, the system may send an indicator to the computing device 522 authenticating the tag. Alternatively, if a match is not found, the system may send a counterfeit indication to the computing device 522.

In another alternative embodiment, the computing device 522 may calculate a digital signature based on the image. The computing device 522 can then compare the digital signature to a printed signature on the tag to verify authenticity. If the signature matches the printed signature, the device is authentic and the computing device 522 can provide an indication of authenticity. Otherwise, the computing device 522 may provide an indication that the device is a counterfeit. In this example, the computing device 522 may be configured to authenticate the tag and associated device, even when the network communication is not available.

In certain embodiments the system may decrypt the encrypted data and may search the data storage 512 to determine one or more matches. To pass as an authentic tag 100, all of the real numbers do not have to match exactly, but their differences should be smaller than a threshold difference. In certain embodiments, the manufacturer that produced the tag 100 may select the threshold. In general, the ability to determine a match without requiring an exact match makes it possible to determine a match with a high degree of reliability without requiring the user of the computing device 522 to take a perfect picture. Further, even if part of the tag 100 is damaged or the image is captured in poor lighting conditions, the system may still be able to determine a match with a high degree of reliability. In an example involving five (5) spheres, the system may determine a match even if signatures of all of the spheres do not match that in the database. In this instance, the computing device 522 may be configured to expect five (5) spheres and may be configured to process the five spheres in a particular order, such as left-to-right. In such an instance, the computing device 522 may be configured to recognize that one or more of the expected objects or spheres 106 are missing. The computing device 522 may still be able to make positive authentication based on only 3 objects.

The system may then return data indicating the authenticity of the product 502. In one example, if a match is found, the data may indicate that the product is authentic. If no match is found, the system may return data indicating that the product may be counterfeit. Other embodiments are also possible.

In some embodiments, the tag 100 may be formed using an ordered sequence of bi-chromal spheres 106 in a-priori known positions, which potentially opens the door to exploitation of robust matching and anti-cloning rules. For example, private-key authentication rules can be used to defeat a counterfeiter who somehow manages to clone the three-dimensional tag, however costly. In general, cryptographic techniques can be applied to further enhance the performance of the device for product authentication and identification.

In a particular example, private-key authentication rules can be used when a device signature is transmitted for comparison with a signature stored in the data storage 512. The comparison procedure can be made to fail, even if the tag 100 has been cloned sufficiently well to fool an imaging system. However, when the counterfeiter fails to implement a particular process required to encode the signature to match the private key, the counterfeit tag may still be detected.

In another example, the private key may accommodate users who may need to authenticate critical equipment without access to a central data base, such as workers or military personnel locations that are remote or otherwise not able to access the data storage 512. To accommodate this use case, the image obtained in the field can be processed by the computing system 522 (for example, a smartphone based system) that extracts the device signature from the tag 100, then encrypts the signature, and outputs a tag code. This tag code could be compared to a code that is printed on the authentication tag 100 for the purpose of authenticating the product. Other embodiments are also possible.

In some cases, the material used to make the tags, such as wax or Teflon, may be susceptible to static electrical charging. Further, in some cases, the three-dimensional bi-chromal objects can be made of materials, such as glass and polyethylene, which can also be susceptible to static electrical charging. In cases where materials susceptible to static electrical charging are involved, the three dimensional objects may clump to each other or to the walls of the imprint, making the dispersion of the three-dimensional objects into the mold less than optimal. Therefore, a method to reduce the electrostatic charge from the imprint and the objects may be desirable.

Figure 6A:
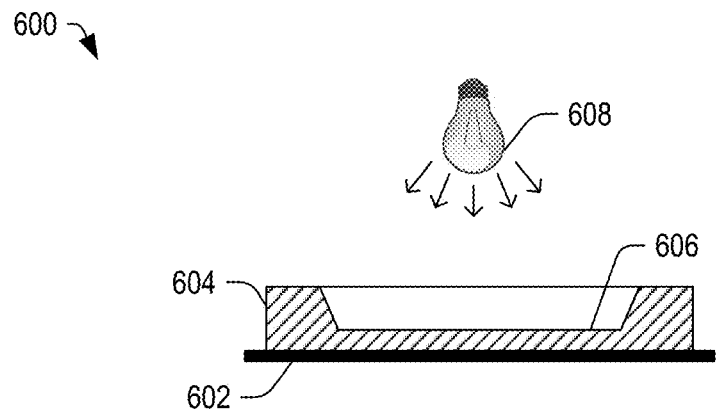
FIG. 6A depicts a block diagram of a portion of a system including an ultraviolet light or an ionization source to reduce static in a mold configured to form the tag, in accordance with certain embodiments of the present disclosure.

FIG. 6A depicts a block diagram of a portion of a system 600 including a device 608 configured to reduce or remove electrostatic charges in a mold or retention area 606 configured to form the tag, in accordance with certain embodiments of the present disclosure. The device 608 may be a source of ultraviolet light. Alternatively, the device 608 may be an ionization source configured to remove or reduce static charge inside the retention area 606. In this example, a material 604 may be disposed on a substrate 602 and may be imprinted (as discussed in FIG. 2) to form an impression 606. In this example, the system 600 may be inserted within the method of FIG. 2 between 220 and 230. In the illustrated example, the formed impression 606 can be irradiated with ultraviolet light 608 sufficient to dissipate static electrical charge. Further, the electrostatic charge from the three-dimensional objects 604 can be removed by exposing them to ionization source before or as they are placed or dropped into the mold 606. The process or ionizing the three-dimensional objects 604 may be inserted within the method of FIG. 2 between 230 and 240, or be incorporated into the step 240.

Figure 6B:
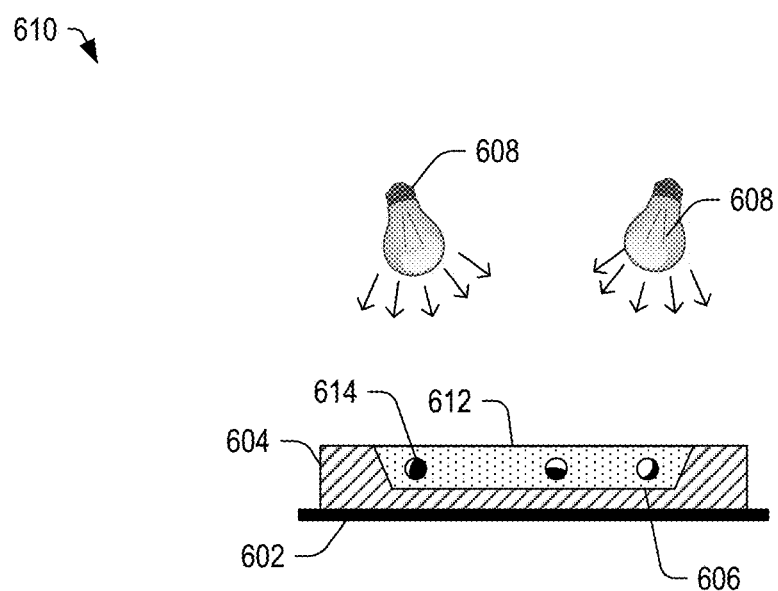
FIG. 6B depicts a block diagram of a portion of a system including multiple ultraviolet lights configured to cure an ultraviolet-sensitive epoxy to form the tag, in accordance with certain embodiments of the present disclosure.

FIG. 6B depicts a block diagram of a portion of a system 600 including multiple ultraviolet lights 608 configured to cure an ultraviolet-sensitive encapsulant (such as an epoxy) 612 to form the tag, in accordance with certain embodiments of the present disclosure. In this example, the three-dimensional objects 604, such as bi-chromal spheres, may be deposited into the impression 606, and UV curable encapsulant 612 may also be deposited into the impression 606. In this example, the UV curable encapsulant 612 can be irradiated from multiple angles with ultraviolet light sufficient to cure portions of epoxy previously shadowed by the three-dimensional objects 604. Other embodiments are also possible. In some embodiments, the system 600 may replace or supplement the step 260 of FIG. 2.

Figure 7A:
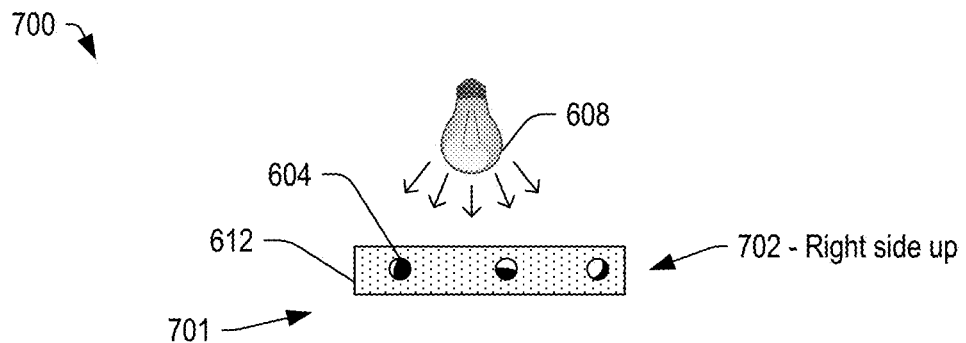
FIGS. 7A-7C depict a partial block diagram and partial flow diagram of a method of producing the tag, in accordance with certain embodiments of the present disclosure.

FIG. 7A depicts a partial block diagram and partial flow diagram of a method of producing the tag, in accordance with certain embodiments of the present disclosure. At 700, the method may include exposing a tag 701 right side up (as indicated at 702) including UV cured encapsulant 612 and three-dimensional objects 604 (i.e., bi-chromal spheres). In some embodiments, the tag 701 may correspond to the tag 282 that was removed from the impression at 280 in FIG. 2.

Figure 7B:
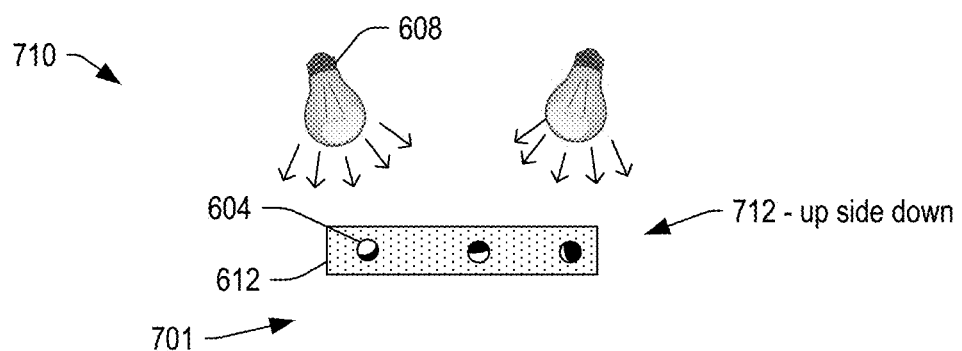

Referring to FIG. 7B, at 710, the tag 701 may be placed upside down (as indicated at 712) and exposed to UV light 608 from multiple angles. The UV light 608 may be sufficient to cure epoxy previously shadowed by the three-dimensional objects 604.

Figure 7C:
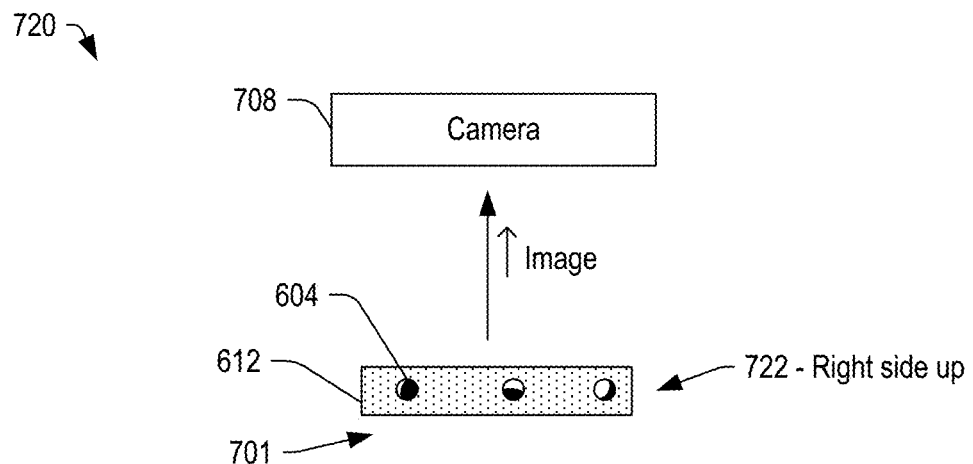

Referring to FIG. 7C, at 720, the tag 701 may be turned right side up, as indicated at 722. The tag 701 may then be imaged using a camera 708, such as a USB camera or a camera integrated within the computing device 508 in FIG. 5A. The image data may be used to inspect the tag 701. Tag defects can be detected and defective tags can be discarded.

Figure 8A:
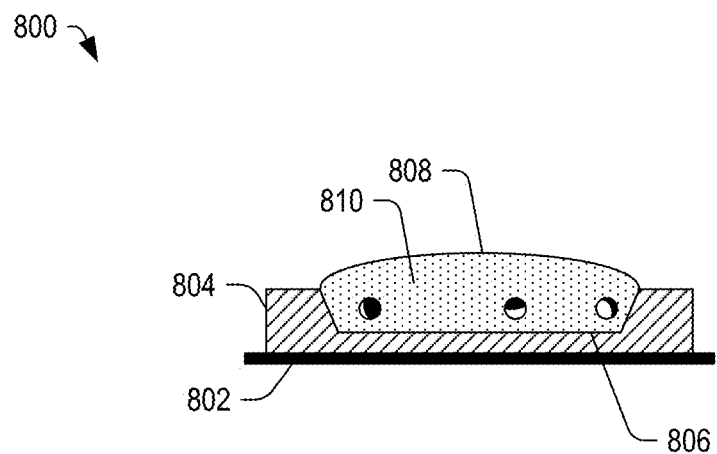
FIG. 8A depicts a tag having a convex meniscus, in accordance with certain embodiments of the present disclosure.

FIG. 8A depicts a tag 800 having a convex meniscus 808, in accordance with certain embodiments of the present disclosure. In certain embodiments, the tag 800 can be fabricated by modifying 230 of FIG. 2 so that the formed impression 806 of a material 804 on a substrate 802 is filled with ultraviolet-curable encapsulant 810 having a convex meniscus 808.

Figure 8B:
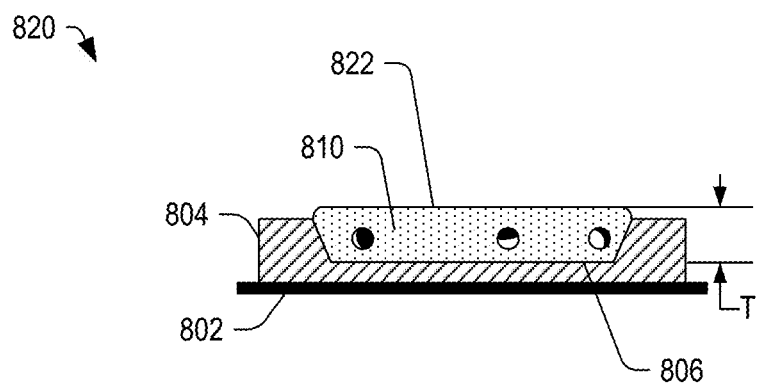
FIG. 8B depicts the tag formed using planarization and polishing to provide a selected, uniform thickness.

Referring to FIG. 8B, a top surface 822 of the cured encapsulant 810 can be lapped, as indicated generally at 820, while the cured encapsulant 810 is held motionless by still being contained within the formed impression 806, so as to fabricate a tag 800 with a predetermined thickness (T). The top surface 822 may be lapped by planarizing and polishing the top surface. In one example, the planarization may be done using mechanical wheel coated with sanding material. In an example, the polishing may be accomplished using mechanical brush wheel and a polishing paste. Optionally, a new (additional) thin layer of uncured encapsulant 810 may be applied to the planarized and polished top surface 822, and the thin layer can be cured to form a new top surface that has better optical properties than the planarized and polished top surface 822.

FIG. 9A depicts an apparatus 900 including a mold material 902 and an impression tool 904 configured to form an imprint 908 in the mold material 902 that includes a conical rim portion 906, in accordance with certain embodiments of the present disclosure. As discussed above, the material 902 may be a wax material or another material that can be imprinted using an impression tool 904. In some instances, the material 902 may be heated in order to facilitate formation of the imprint 908.

FIG. 9B illustrates a top view 910 of the mold material 902 after the imprint 908 is formed, in accordance with certain embodiments of the present disclosure. In the above discussion, many of the views have shown tags that were substantially rectangular. In this example, the imprint 908 has a substantially cylindrical shape 908 and including a conical portion 906.

FIG. 9C depicts a side view of the mold material 902 including a cavity 904 and including a plurality of three-dimensional objects 922 disposed randomly within the imprint 908, in accordance with certain embodiments of the present disclosure. As the three-dimensional objects 922 are dropped into the imprint 908, some of the objects 922 may ricochet off of the conical portion 906, further contributing to the random distribution of objects 922 within the imprint 908. In some embodiments, the three-dimensional objects 922 may be so small and light that air currents may have a greater impact on their distribution than gravity. In such an instance, the three dimensional objects 922 may be placed into the imprint 908.

Figure 10:
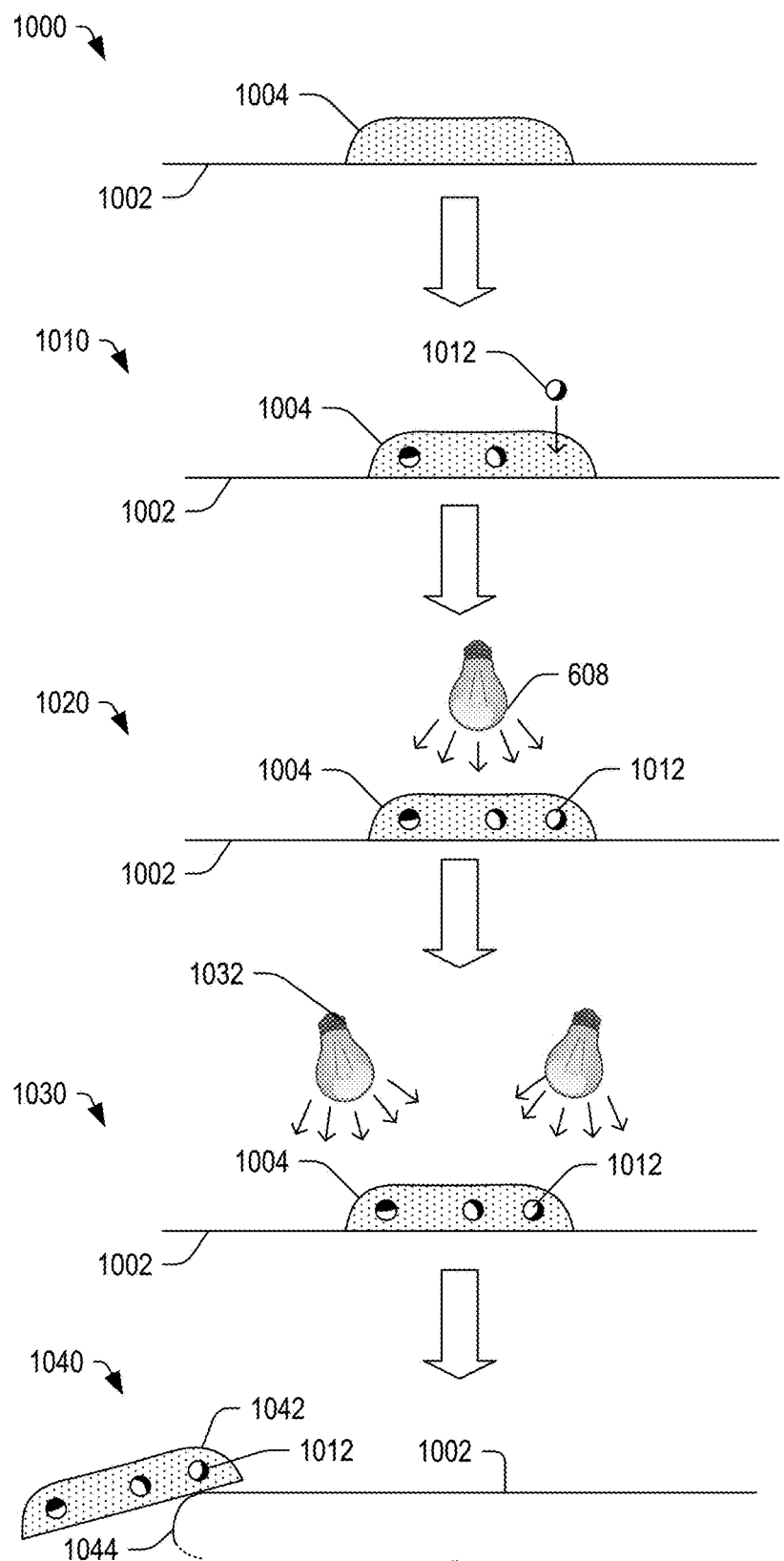
FIG. 10 depicts a partial block diagram and partial flow diagram of a method of forming a thin tag, in accordance with certain embodiments of the present disclosure.

FIG. 10 depicts a partial block diagram and partial flow diagram of a method of forming a thin tag, in accordance with certain embodiments of the present disclosure. In this example, rather than forming the encapsulant within an impression, the tag may be formed directly onto a surface of the product or can be formed on a hard-to-bond substrate (such as a peelable tape substrate) and subsequently attached to the surface of the product. At 1000, a thin layer of ultraviolet curable encapsulant 1004 can be deposited on a substrate 1002. It is desirable that the substrate 1002 is made out of material that does not bond well to the encapsulant material 1004 and can therefore easily be removed from it after the encapsulant material 1004 has been cured and has solidified. Examples of desirable materials for the substrate 1002 can include Kapton® or Teflon® of E. I. du Pont de Nemours and Company of Delaware. In another example, the substrate 1002 can include an adhesive tape material.

At 1010, a plurality of three-dimensional bi-chromal objects 1012 can be placed or dropped into the thin layer of ultraviolet curable encapsulant 1004. The objects 1012 may be fully submerged or partially immersed in the encapsulant 1004, depending on the implementation. At 1020, the ultraviolet curable encapsulant 1004 including the bi-chromal objects 1012 can be cured by irradiation with ultraviolet light 608 in one or more directions.

At 1040, the cured epoxy 1042 containing the three-dimensional bi-chromal objects 1012 can be removed from the substrate 1002, and can then be attached to the product using an adhesive, for example. Alternatively, epoxy or encapsulant material may be used to secure the cured epoxy 1042 to the substrate as a tag.

In some embodiments, as discussed above, the tag may be formed within a restraining imprint of an impressionable material, such as wax. In some instances, it may be desirable to remove residues of such material from the tag.

Figure 11:
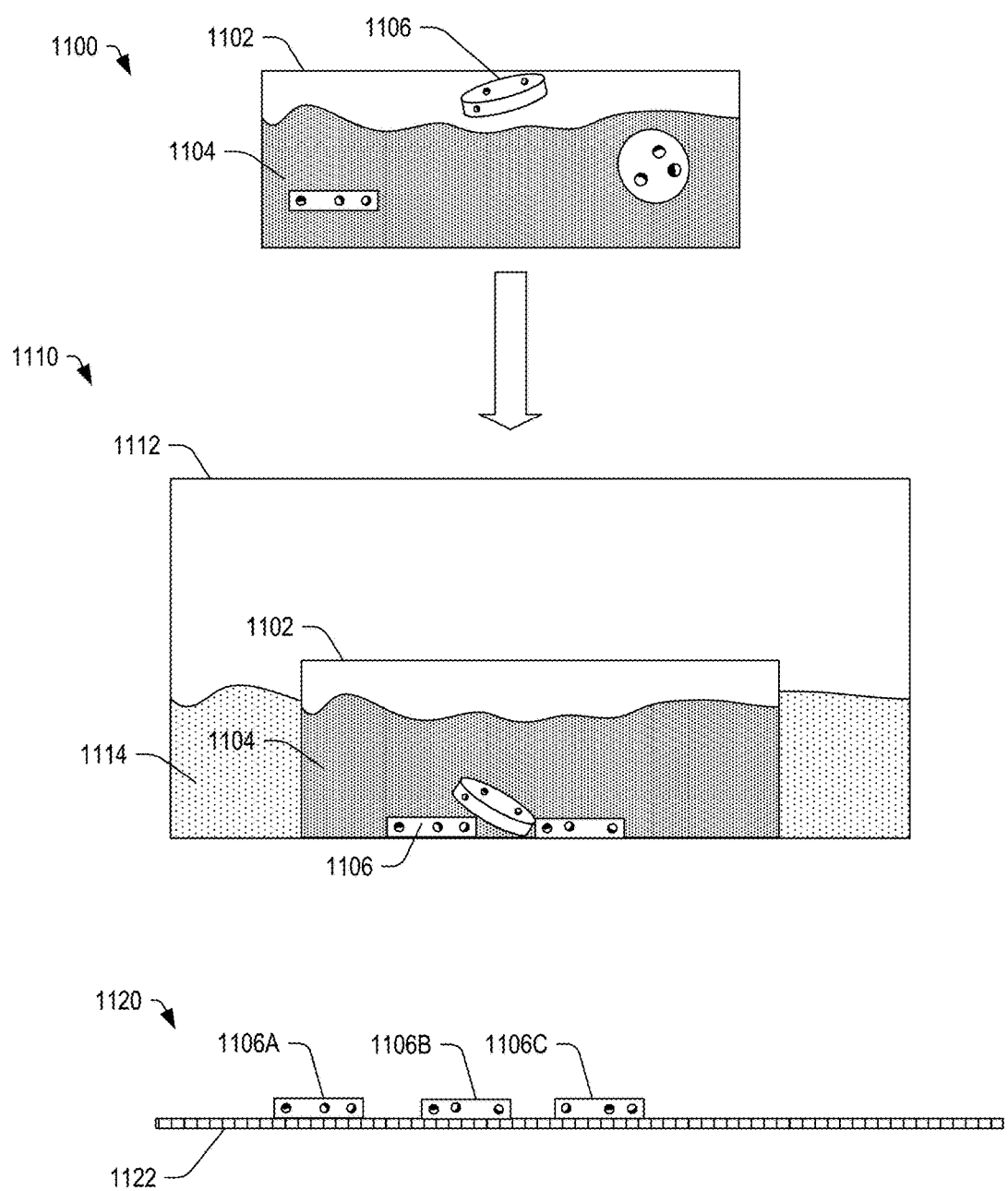
FIG. 11 depicts a partial block diagram and partial flow diagram of a method of removing excess wax residues from a tag, in accordance with certain embodiments of the present disclosure.

FIG. 11 depicts a partial block diagram and partial flow diagram of a method of removing excess wax from a tag, in accordance with certain embodiments of the present disclosure. At 1100, a plurality of tags 1106 may be deposited into a container 1102 including a solvent 1104 capable of dissolving wax such that the tags 1106 are immersed in the solvent 1104. In some embodiments, hot deionized water may be added to the solvent 1104, creating a mixture of solvent and hot deionized water. One such solvent 1104 is an isopropyl alcohol.

At 1110, the container 1102 may be placed within an ultrasonication chamber 1112 including ultrasonic fluid 1114 that can be irradiated with ultrasonic waves resulting in agitation. In this example, the ultrasonic fluid 1114 may be agitated to assist in the wax removal. In some embodiments, the temperature of the hot deionized water can be 60 C, and the ultrasonication time can be 5 minutes.

At 1120, the tags 1106A, 1106B, and 1106C can be dispensed (with wax removed) onto an absorbent substrate 1122. The tags 1106 may be extracted, drained, or otherwise removed from the solvent 1104 and may be placed on the absorbent substrate 1122.

Figure 12:
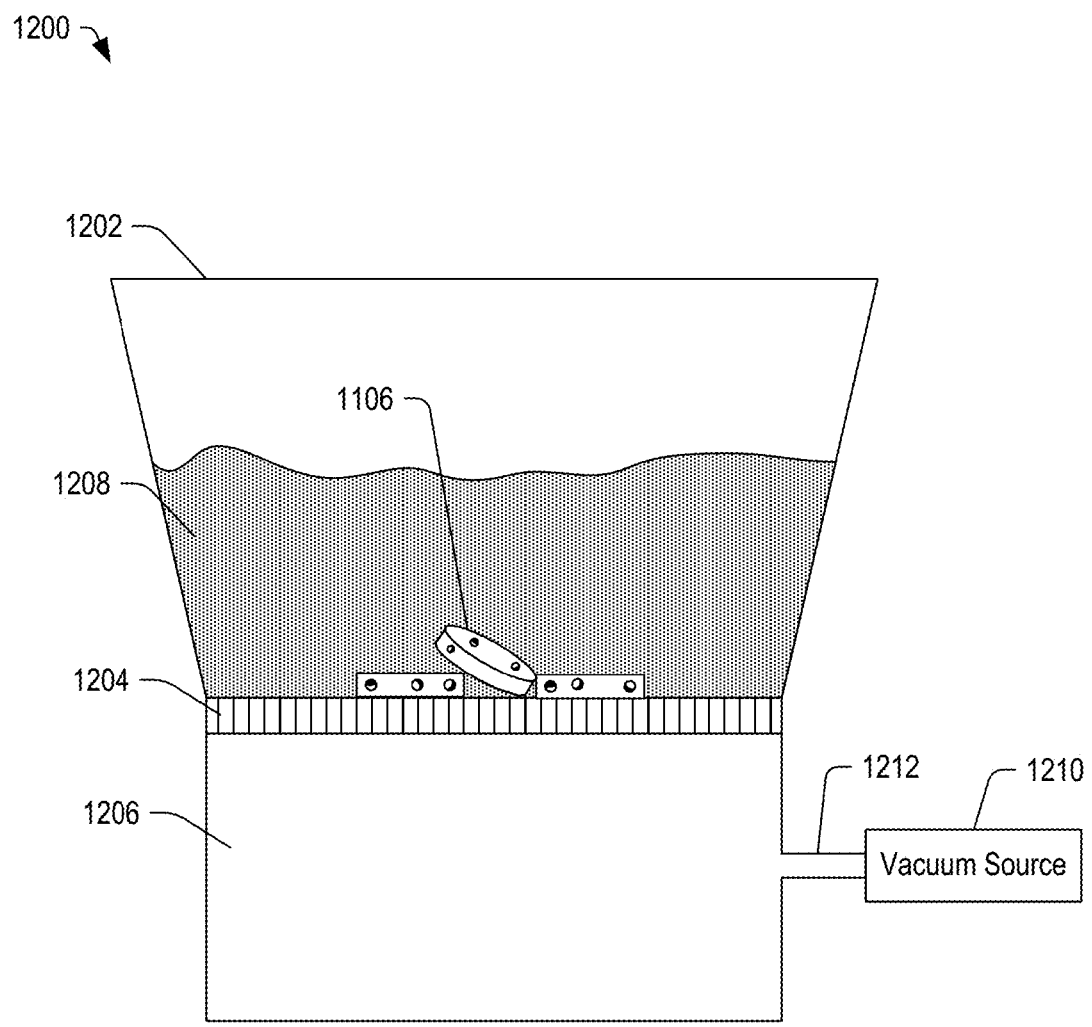
FIG. 12 illustrates a block diagram of a device configured to remove excess wax residues from a tag, in accordance with certain embodiments of the present disclosure.

FIG. 12 illustrates a block diagram of a device 1200 configured to remove excess wax from a tag, in accordance with certain embodiments of the present disclosure. Part of the device 1200 may be commonly known as a vacuum filtration system, which can be used to filter particles or objects from a liquid solution. The device 1200 may include an upper chamber 1202 including a solution 1208, such as a water and alcohol solution. The device 1200 may further include a lower chamber 1206 and a filter 1204 disposed between the upper chamber 1202 and the lower chamber 1206.

In some embodiments, the solution and the tags 1106 may be poured or deposited into the upper chamber 1202. The water and alcohol solution 1208 can flow through the filter 1204 into the lower chamber 1206 by a suction created by a vacuum from vacuum source 1210. The water and alcohol solution 1208 remain in the lower chamber 1206 and have to be removed once the lower chamber 1206 gets filled up. After the water and alcohol solution 1208 drains through the filter 1204, the cleaned tags 1106 are left on the upper surface of the filter 1204. In some embodiments, hot deionized water can be poured into the upper chamber 1202 as needed to complete the wax removal process, and the hot deionized water can be drained into the lower chamber 1206 via the suction from the vacuum source 1210.

Figure 13A:
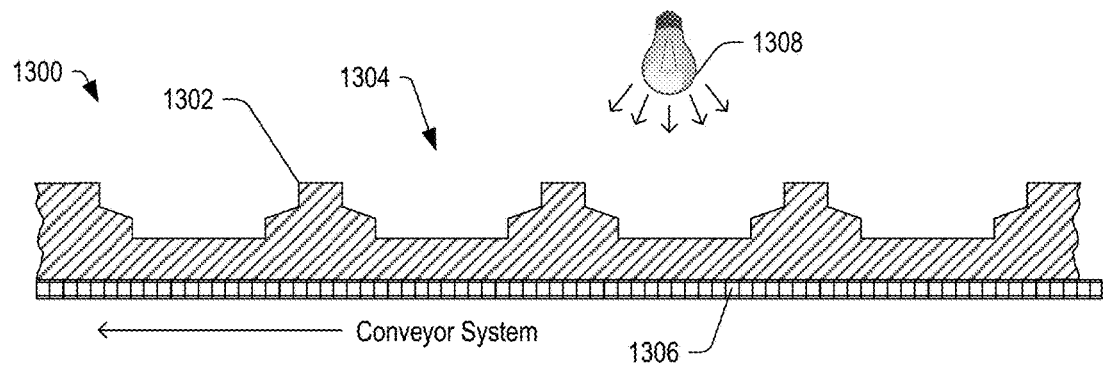
FIG. 13A depicts a system including a conveyor and an array of imprints configured to form a tag, in accordance with certain embodiments of the present disclosure.

FIG. 13A depicts a system 1300 including a conveyor 1306 and an impression material 1302 including an array of imprints 1304 configured to form a tag, in accordance with certain embodiments of the present disclosure. The material 1302 can be carried on the conveyor system 1306, which can cease movement momentarily while an array of imprint tools (not shown) moves downward and upward to imprint the material 1302, forming the array of impressions 1304. Multiple arrays of impressions 1304 can be made by repeating the impression forming step.

In some embodiments, a machinable material can be used instead of the impressionable material 1302, and an array of machining tools can be used to form the arrays of machined spaces for subsequent placement of three-dimensional bi-chromal objects. The array of machining tools can be shaped so as to machine spaces with conical rims. The conveyor 1306 can carry the array 1304 beneath a source of ultraviolet light 1308, which irradiates the formed impressions with ultraviolet light sufficient to dissipate static electrical charge. In some embodiments, an ionization source can be used instead of an ultraviolet light source for the purpose of dissipating static electrical charge.

Figure 13B:
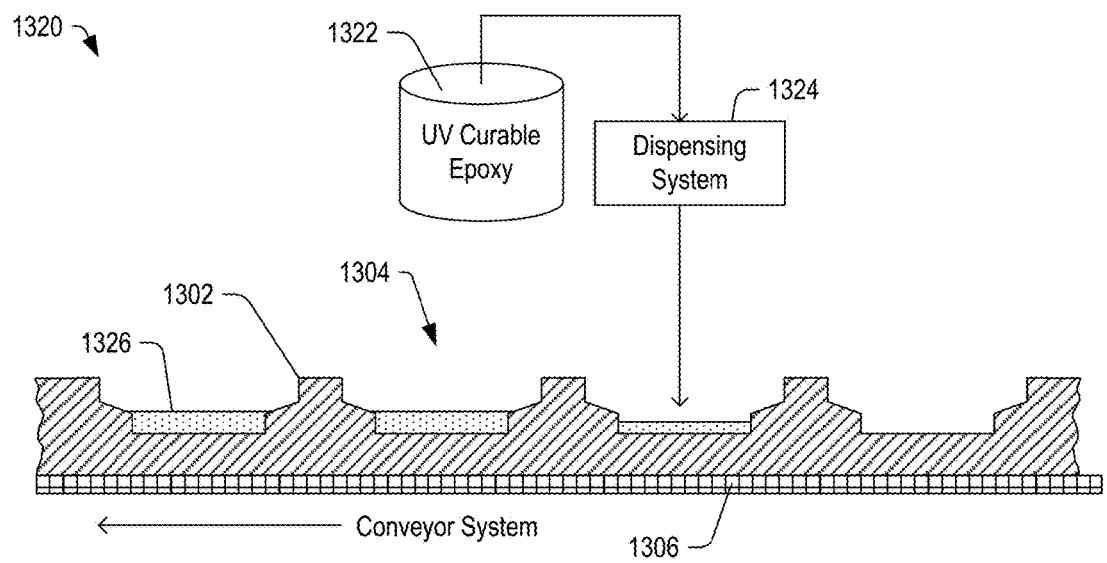
FIG. 13B depicts a system including the array of imprints and an encapsulant dispensing system, in accordance with certain embodiments of the present disclosure.

FIG. 13B depicts a system 1320 including the array of imprints 1304 and an encapsulant dispensing system, in accordance with certain embodiments of the present disclosure. The system 1320 includes the material 1302 and the array of imprints 1304. The conveyor system 1306 may advance the array of imprints 1304 beneath the encapsulant dispensing system including a UV curable epoxy 1322 (or other curable encapsulant) and a dispensing system 1324. The dispensing system 1324 may dispense some of the epoxy into the imprints 1304 as they pass beneath the dispensing system 1324 on the conveyor system 1306.

Figure 14A:
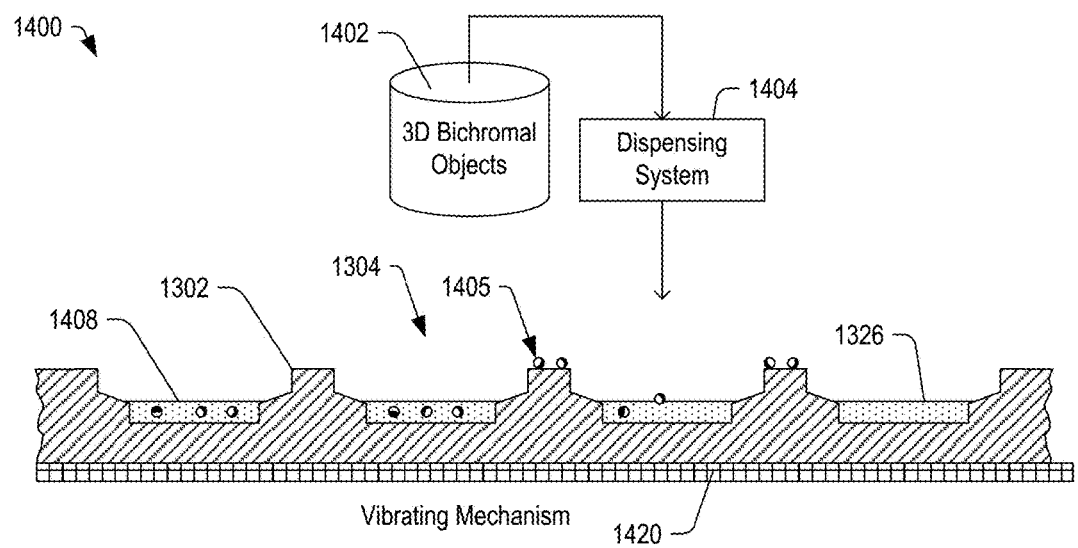
FIG. 14A illustrates a system including a three-dimensional object dispensing system, in accordance with certain embodiments of the present disclosure.

FIG. 14A illustrates a system 1400 including a three-dimensional object dispensing system, in accordance with certain embodiments of the present disclosure. The system 1400 may include an inventory of 3D bi-chromal objects 1402 and a dispensing system 1404 configured to drop the objects onto the impressionable material and into the UV curable epoxy 1326 within each of the imprints 1304 to form encapsulated objects 1408.

In certain embodiments, the dispensing system 1404 may control the dispensed number of three-dimensional bi-chromal objects 1406. Further, in some embodiments, the dispensing system 1404 dispenses large number of three-dimensional objects 1406 near the plurality of imprints 1304 and a vibrating or shaking mechanism 1402 may cause the three-dimensional objects 1405 to vibrate and eventually fall into the imprints 1304, which are designed to fit fixed number of objects 1405. The excess objects 1405 that did not make it into the well or imprint 1304 may be removed with a mechanism, such as brush or directed stream of compressed air. In some embodiments, steps may be reversed in which case randomly-oriented, three-dimensional bi-chromal objects 14056 may first be placed into the array of imprints 1304, after which the formed imprint containing the three-dimensional bi-chromal objects can be filled with ultraviolet-curable encapsulant (or epoxy) 1326.

Figure 14B:
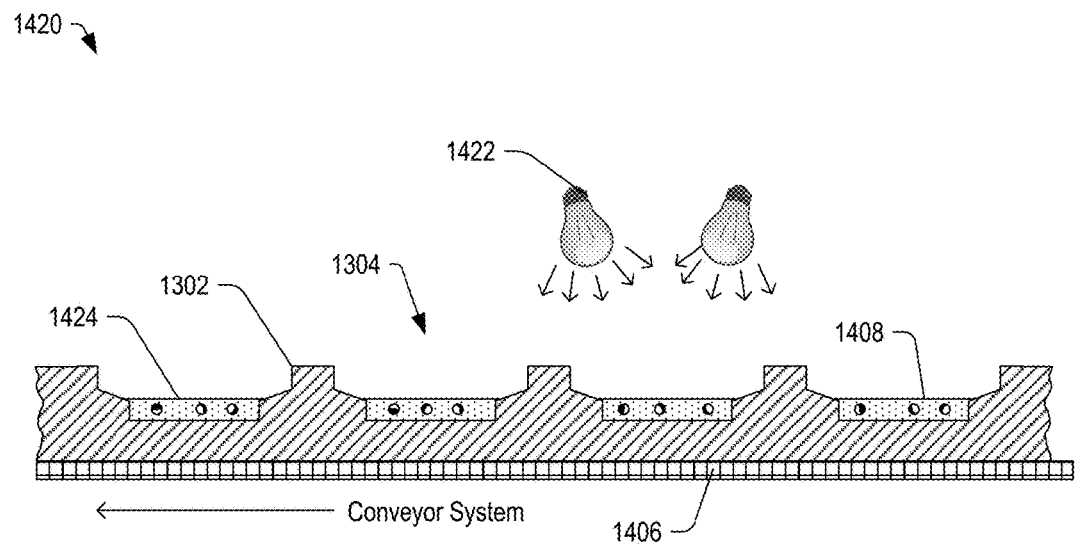
FIG. 14B depicts a system including an ultraviolet light source configured to cure the encapsulant material, in accordance with certain embodiments of the present disclosure.

FIG. 14B depicts a system 1420 including an ultraviolet light source 1422 configured to cure the encapsulant, in accordance with certain embodiments of the present disclosure. The system 1420 includes the conveyor system 1406 configured to move the array of impressions 1304 including the encapsulated objects 1408 underneath the UV light source 1422, which may irradiate the encapsulated objects 1408 from multiple directions, to form UV cured tags 1424. In this example the UV source 1422 or multiple UV sources 1422 may be point source bulbs. The UV light source 1422 may be configured to optimize the delivery of UV light over the moving array of encapsulated objects 1408 so as to deliver the desired dose of UV light over a prescribed time as determined by the speed of motion of the conveyor system 1406. In one example, the UV light source 1422 may be a long cylindrical bulb that is aligned with the direction of motion of the conveyor system 1406 and that may be configured to irradiate multiple encapsulated objects 1408. In another example, the UV source 1422 may include a 2-D array of parallel long cylindrical bulbs configured to irradiate a 2-D array of encapsulated objects 1408.

Figure 15A:
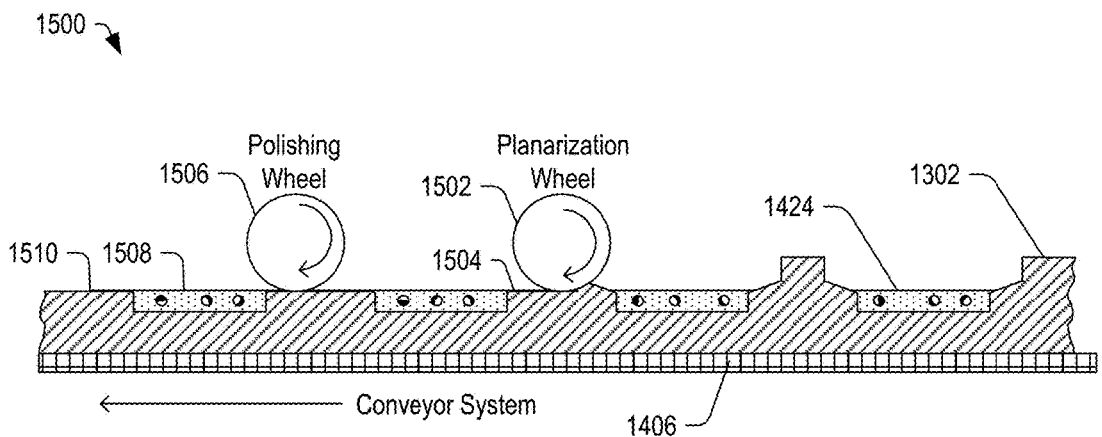
FIG. 15A depicts a system including an apparatus to planarize and polish the array including the tags, in accordance with certain embodiments of the present disclosure.

FIG. 15A depicts a system 1500 including an apparatus to planarize and polish the array including the tags, in accordance with certain embodiments of the present disclosure. The system 1500 includes the conveyor system 1406 configured to advance the material 1302 and the UV cured tags 1424 beneath a planarization wheel 1502, which may produce a planar surface 1504. The planarization wheel 1502 can planarize the material and the UV cured tags 1424 to a desired thickness. The conveyor system 1406 further continues to advance the planar surface 1504 beneath a polishing wheel 1506, which polishes the planar surface 1504 to produce polished UV cured tags 1508 and a polished surface

1510. The polishing wheel 1506 can polish the surface of the UV cured tags 1508 and the surface 1510 to a predetermined surface roughness.

Figure 15B:
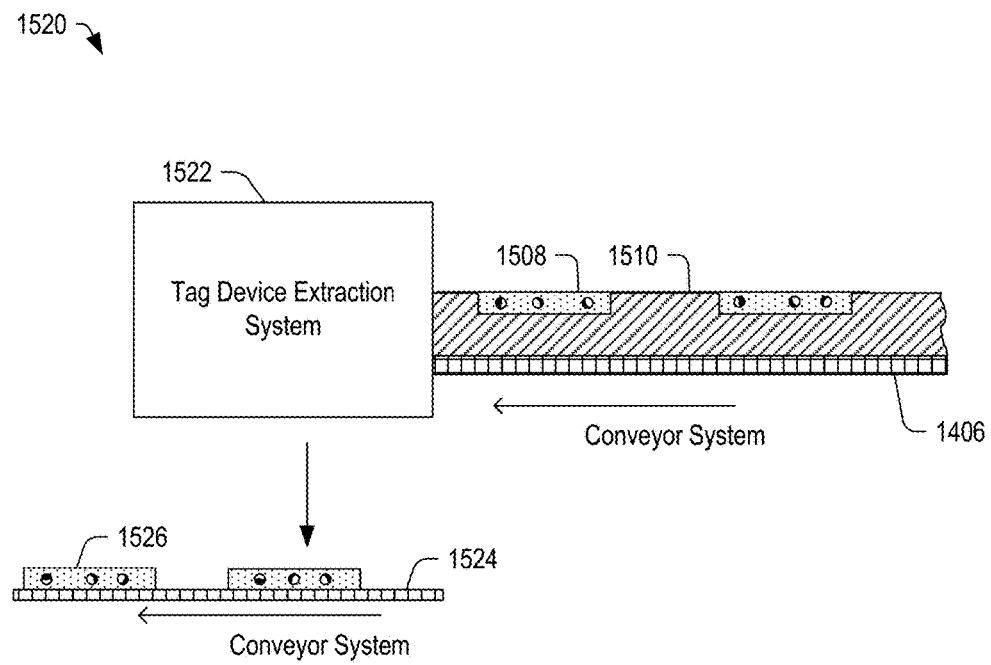
FIG. 15B illustrates a system including a tag extraction system, in accordance with certain embodiments of the present disclosure.

FIG. 15B illustrates a system 1520 including a tag extraction system 1522, in accordance with certain embodiments of the present disclosure. The conveyor system 1406 may advance the planar polished UV cured tags 1508 and the surface 1510 to the tag device extraction system 1522, which may extract each UV cured tag 1508 from the material 1510. The extracted tags 1526 may be applied to another conveyor system 1524, which may advance the extracted tags 1526 to an inspection system.

In some embodiments, the tag device extraction system 1522 may include a system for automating the ultrasonication and vacuum filtration methods, as described above with respect to FIGS. 11 and 12. Alternatively, the tag device extraction system 1522 may include a mechanical system for separating the tag devices 1508 from the surrounding material 1510. In an example, the substrate of the conveyor system 1406 may have a flexible surface, which may cause the material 1510 to bend, releasing the UV cured and polished tag 1508.

Figure 16A:
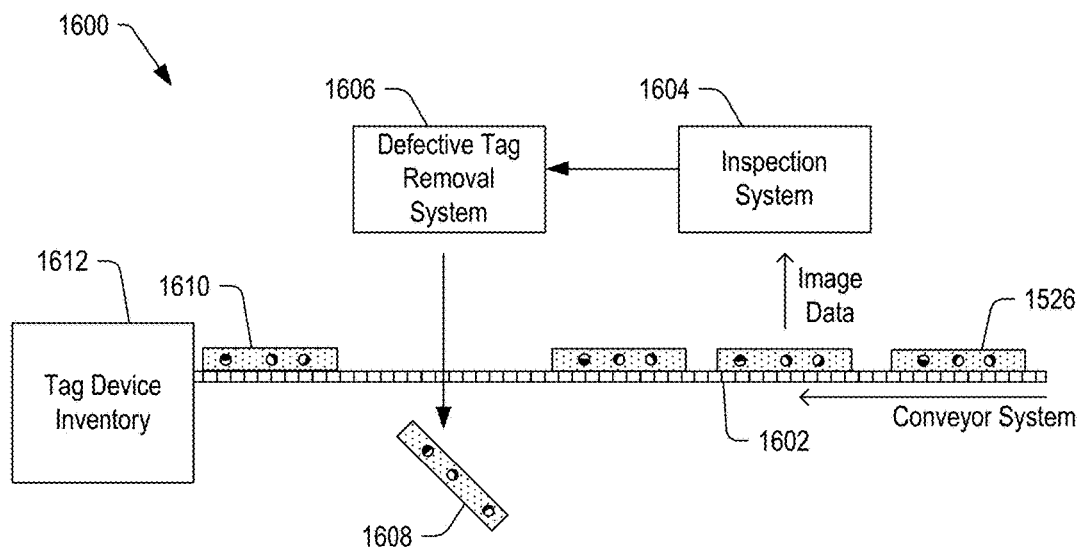
FIG. 16A depicts a system including a tag inspection system and defective tag removal system, in accordance with certain embodiments of the present disclosure.

FIG. 16A depicts a system 1600 including a tag inspection system 1604 and defect removal system 1606, in accordance with certain embodiments of the present disclosure. In some embodiments, the tag inspection system 1604 and the defective tag removal system 1606 may be combined.

The system 1600 further includes a conveyor system 1602, which may be configured to carry the extracted tags 1526 beneath the inspection system 1604. The inspection system 1604 may capture images of the extracted tags 1526. The inspection system 1604 may process the image data to identify defective tags, such as a tag that includes too few or too many bi-chromal objects, a tag that is insufficiently polished such that the bi-chromal objects cannot be discerned, or a tag that has some other defect.

The inspection system 1604 may communicate with a defective tag removal system 1606 via a communication link to control the removal of the defective tag 1608. Tags, such as the tab 1610, that pass the inspection by the inspection system 1604, may be delivered to a tag device inventory 1612. The tags within the tag device inventory 1612 may be used to label various products.

Figure 16B:
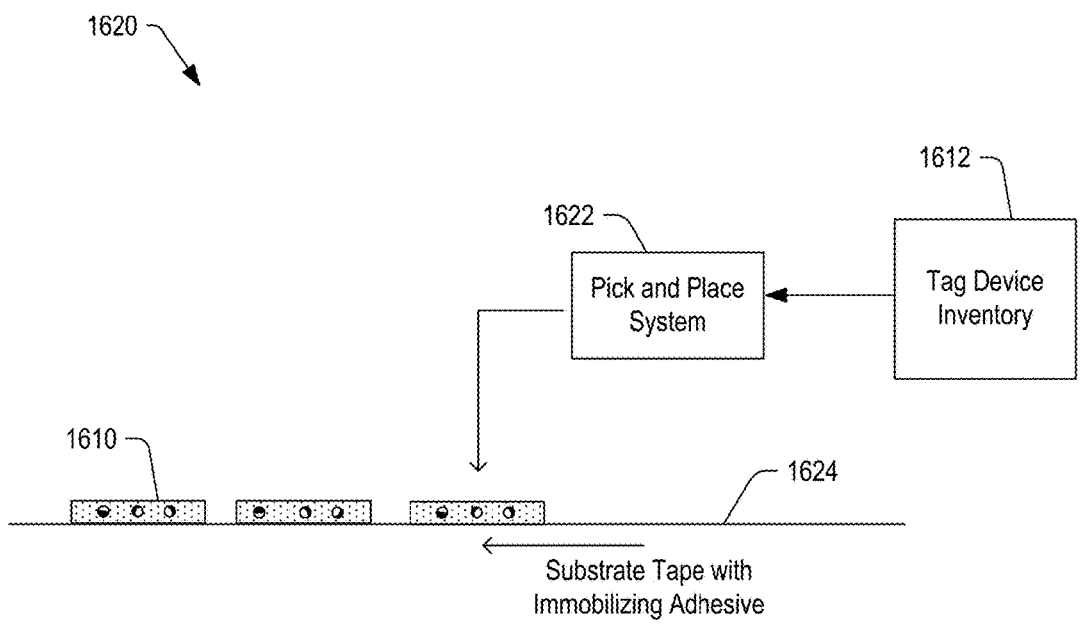
FIG. 16B depicts a system including a pick-and-place system to place the tags on a substrate tape, in accordance with certain embodiments of the present disclosure.

FIG. 16B depicts a system 1620 including a pick-and-place system 1622 to place the tags 1610 on a substrate tape 1624, in accordance with certain embodiments of the present disclosure. In some embodiments, the pick-and-place system 1622 may select a tag 1610 from a tag device inventory 1612 and may apply the selected tag 1610 to the substrate tape 1624, which may include an immobilizing adhesive to secure the tags 1610.

Figure 17A:
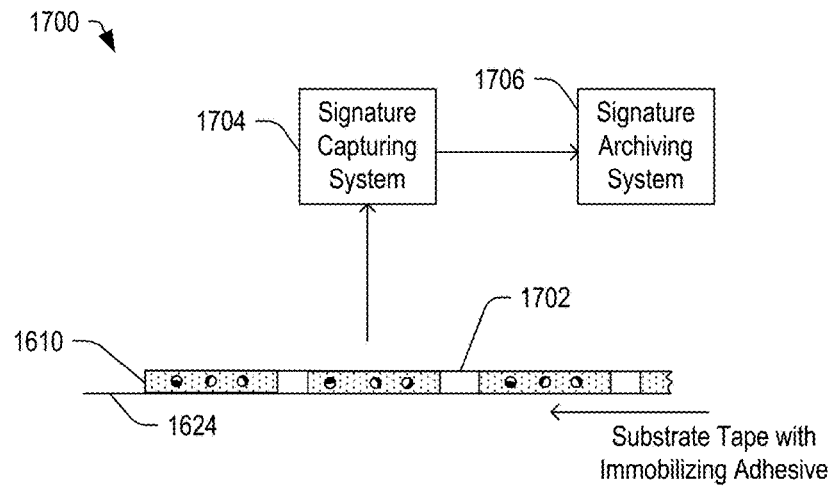
FIG. 17A depicts a system including a tag signature capturing system, in accordance with certain embodiments of the present disclosure.

FIG. 17A depicts a system 1700 including a tag signature capturing system 1704, in accordance with certain embodiments of the present disclosure. A conveyor system may advance the tags 1610 on the substrate tape 1624 under the signature capturing system 1704. In some embodiments, the tags 1610 may be covered by a clear cover tape 1702.

The signature capturing system 1704 may capture one or more images of each tag 1610. For example, in some embodiments, the signature capturing system 1704 may capture an image before the clear cover tape 1702 is applied, after the clear cover tape 1702 is applied, or both. In some instances, the clear cover tape 1702 can have a small amount of dirt or dust, possibly due to static charges acting on the clear cover tape 1702. Such dirt or dust may alter the captured image. In some embodiments, the image captured by the signature capturing system 1704 may be the same through the clear cover tape 1702 and without the clear cover tape 1702.

The signature capturing system 1704 may process the image data to determine characteristics associated with each three dimensional object to determine the signature of each tag 1610. The signature capturing system 1704 may provide the signature data to a signature archiving system 1706, which may store the signatures. The substrate tape 1624 including the tags 1610 can then be rolled onto a reel, or provided to another packaging system, for transport to a location where the tags 1610 are attached to products.

Figure 17B:
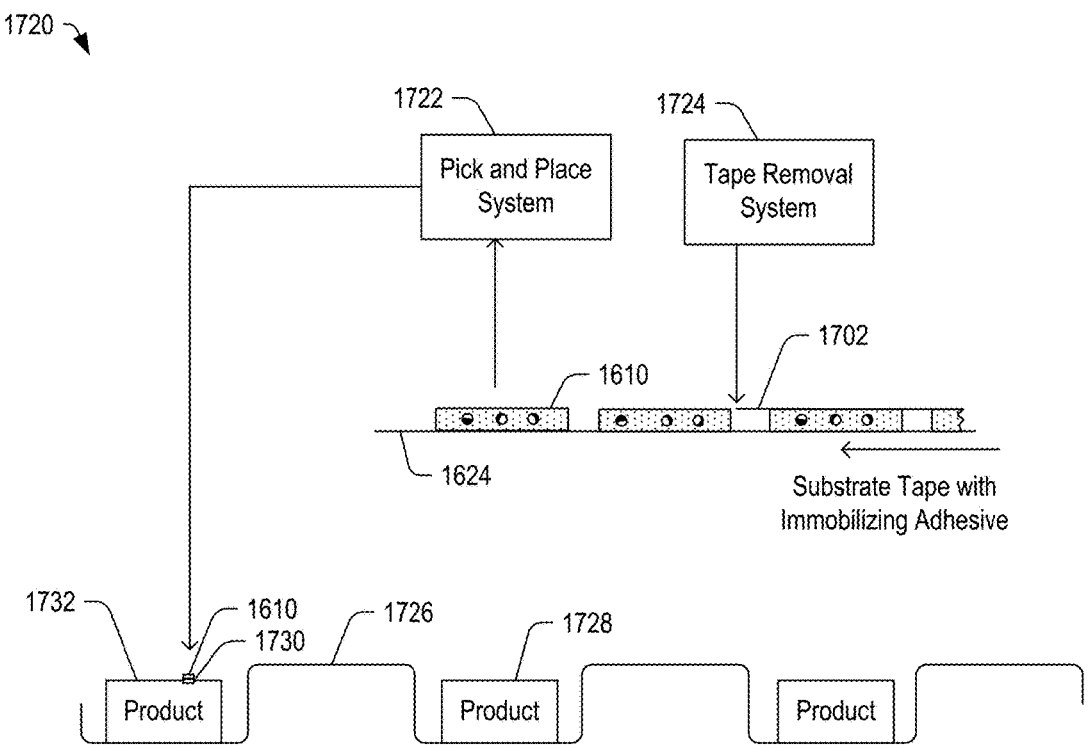
FIG. 17B depicts a system including a pick-and-place system to selectively apply the three-dimensional tag to a product, in accordance with certain embodiments of the present disclosure.

FIG. 17B depicts a system 1720 including a pick-and-place system 1722 to selectively apply the three-dimensional tag 1610 to a product 1732, in accordance with certain embodiments of the present disclosure. The system 1720 may include a tape removal system 1724 configured to remove the clear cover tape 1702. The system 1720 may further include a carrier 1726 for carrying a plurality of products 1728. The pick-and-place system 1722 may pick one of the tags 1610 and may place adhesive 1730 onto one of the products 1728. The pick-and-place system 1722 may then place the selected tag 1610 onto the glue to affix the tag 1610 to the product 1728 to produce a labeled product 1732.

In some embodiments, depending on the size of the product 1728, a clear tape may be applied to keep the products 1728 from falling off. Imaging for the database may happen before the clear tape is applied, after the clear tape is applied, or both.

Figure 18A:
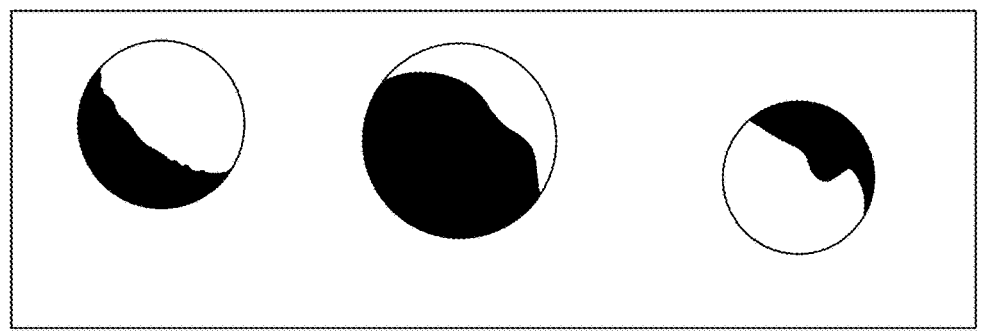
FIG. 18A depicts a tag including three-dimensional objects, in accordance with certain embodiments of the present disclosure.

FIG. 18A depicts a tag 1800 including three-dimensional objects, in accordance with certain embodiments of the present disclosure. The tag 1800 may be an illustrative example of any of the tags described above with respect to FIGS. 1A-17B. The tag 1800 may be applied to the surface of a product. Using a computing system, the tag 1800 may be imaged using a system, such as the systems described above with respect to FIGS. 5A and 5B.

Figure 18B:
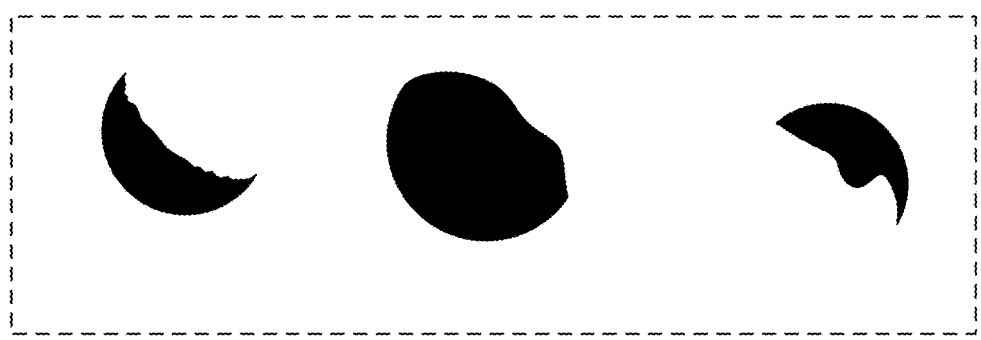
FIG. 18B depicts optical data associated with the three-dimensional objects captured from the tag of FIG. 18A.

FIG. 18B depicts optical data 1820 associated with the three-dimensional objects captured from the tag of FIG. 18A, after some image analysis filters have been applied, for example to display one color range and ignore other color ranges. In the illustrated example, the camera may capture a shape associated with one of the two colors or with one portion of each of the three-dimensional shapes. The captured shape can be used to determine the centroid, the orientation, the size, the relative angles, positions, and elevations of the objects. Further, the color distributions and the lines of demarcation between the colors of a given object may vary from object to object. Such variations may be used to determine a unique signature of the tag.

It should be appreciated that the raw image is a two-dimensional (2D) projection of a three-dimensional object. After some image analysis is applied, such as color threshold image analysis, only a narrow range of colors may be displayed as a 2D image while other colors (captured in the image) can be excluded (filtered out). Such color filtering may be used to determine which colors work best for a particular application, for example. However, the selected color may be used to determine a plurality of characteristics, one or more of which may be used to produce one or more unique signatures for a particular object.

Figure 19:
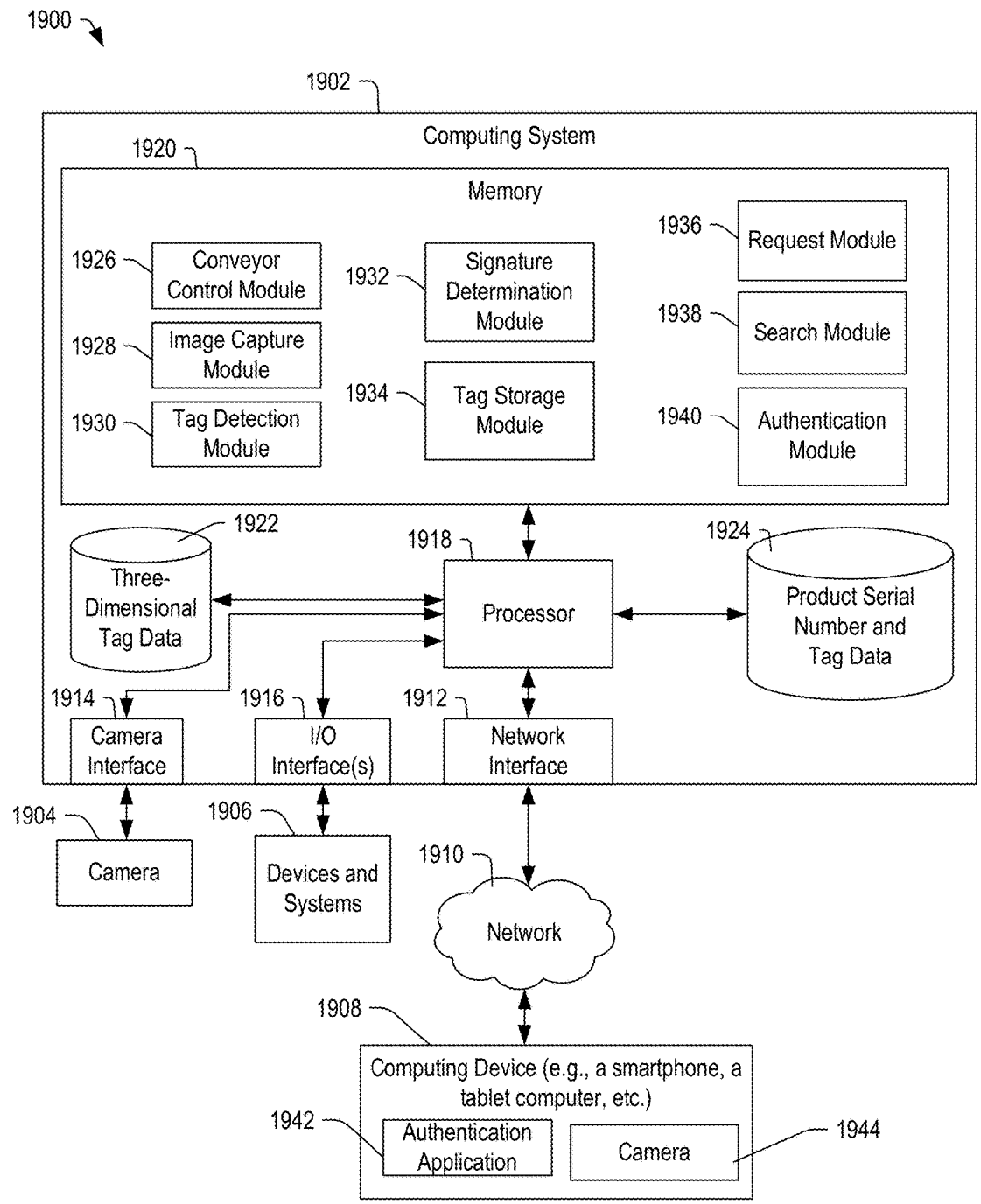
FIG. 19 depicts a block diagram of a system including a computing system configured to authenticate a product based on an image of a tag, in accordance with certain embodiments of the present disclosure.

FIG. 19 depicts a block diagram of a system 1900 including a computing system 1902 configured to authenticate a product based on an image of a tag, in accordance with certain embodiments of the present disclosure. The computing system 1902 may be configured to communicate with a camera 1904, one or more devices and systems 1906 (such as conveyor systems, imaging systems, pick-and-place systems, and so on), and other computing devices 1908 via a network 1910. The other computing devices 1908 may include smartphones, tablet computers, laptop computers, desktop computers, other computing devices, or any combination thereof.

The computing system 1902 may include a network interface 1912 configured to communicate with the network 1910. The computing system 1902 may further include a camera interface 1914 coupled to the camera 1904. The computing system 1902 can also include one or more input/output (I/O) interfaces 1916, which may be configured to communicate with one or more external devices or systems 1906. The computing system 1902 may also include a processor 1918 coupled to the network interface 1912, the camera interface 1914, and the I/O interfaces 1916. The processor 1918 may also be coupled to a memory 1920, to a database of three-dimensional tag data 1922, and to a database of product serial number and tag data 1924.

The processor 1918 may execute a conveyor control module 1926 (stored in memory 1920) that, when executed, may cause the processor 1918 to determine one or more attributes of a conveyor system and optionally control the conveyor system. The memory 1920 may also include an image capture module 1928 that, when executed, may cause the processor 1918 to control a camera 1904 to capture images of a tag or a tag/product combination.

The memory 1920 can include a tag detection module 1930 that, when executed, may cause the processor 1918 to detect a tag within the image captured by the camera 1904 or received from the computing device 1908. The memory 1920 can include a signature determination module 1932 that, when executed, may cause the processor 1918 to determine one or more characteristics related to the plurality of three-dimensional objects, including the azimuth angle, the elevation angle, the distance between objects, color ratio variations, imperfections of the objects, other characteristics, or any combination thereof. The signature determination module 1932 may cause the processor 1918 to utilize one or more of the characteristics to calculate a signature for each object within a tag, for one or more selected objects within a tag, or any combination thereof.

The memory 1920 can also include a tag storage module 1934 that, when executed, may cause the processor 1918 to store the signature data in the three-dimensional tag data 1922. In some embodiments, the tag storage module 1934 may cause the processor 1918 to encrypt the signature data prior to storage in the three-dimensional tag data 1922.

The memory 1920 may also include a request module 1936 that, when executed, may cause the processor 1918 to receive a request to authenticate a particular product from a computing device 1908. The request may include an image including the tag and may include a serial number corresponding to the product. The request module 1936 may cause the processor 1918 to process the image using the tag detection module 1930 and to determine a signature from the tag image using the signature detection module 1932. The memory 1920 may further include a search module 1938 that, when executed, may cause the processor 1918 to search the product serial number and tag data 1924 to determine a match between the serial number and the signature determined from the received data and product serial numbers and signatures stored in the database 1924. The memory 1920 can also include an authentication module 1940 that, when executed, may cause the processor 1918 to communicate data to the computing device 1908 indicating that the product is authentic when a match is found or indicating that the product is counterfeit when no match is found. Other embodiments are also possible.

In some embodiments, the computing device 1908 may include a processor and an authentication application 1942 that, when executed, may cause the processor to provide an interface through which a user may be prompted to capture an image of a product using a camera 1944. The authentication application 1942 may also prompt the user to enter a serial number or lot number of a product. The authentication application 1942 may also cause the processor to communicate the image data and the serial number to the computing system 1902 to request authentication. In some embodiments, the computing system 1902 may provide data indicating authentic or counterfeit to the authentication application 1942, which may provide an indicator to a display, such as a touchscreen, of the computing device 1908. Other embodiments are also possible.

Figure 20:
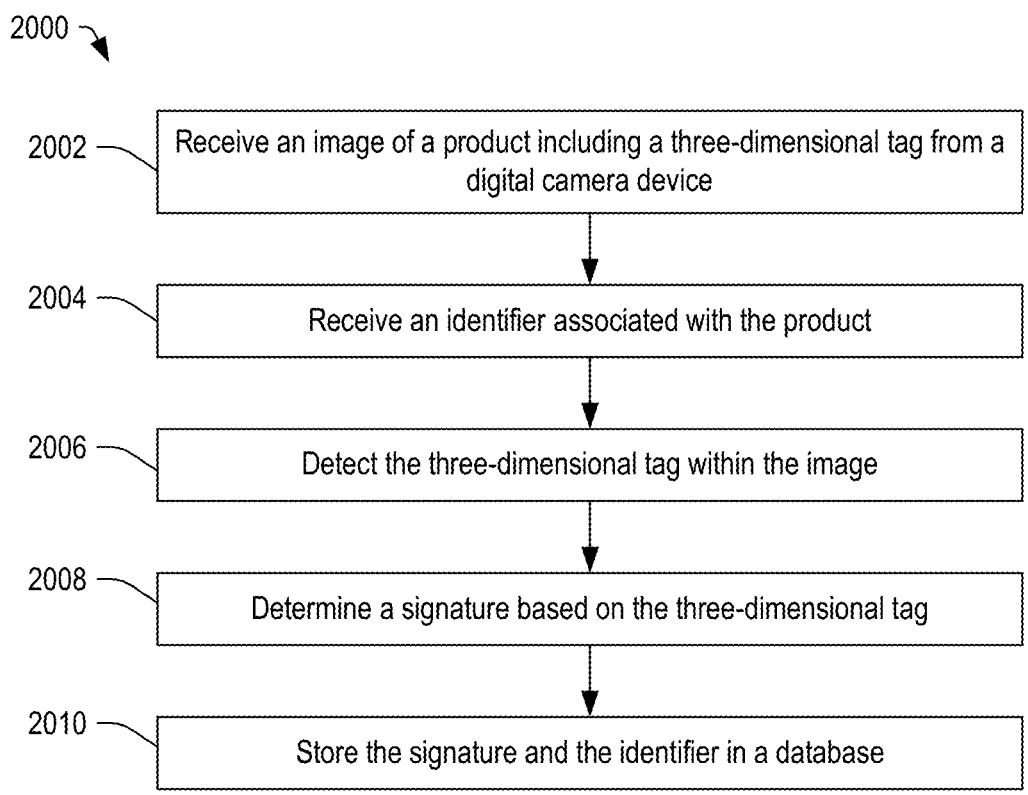
FIG. 20 illustrates a flow diagram of a method of associating a product with a particular tag, in accordance with certain embodiments of the present disclosure.

FIG. 20 illustrates a flow diagram of a method 2000 of associating a product with a particular tag, in accordance with certain embodiments of the present disclosure. At 2002, the method 2000 may include receiving an image of a product including a three-dimensional tag from a digital camera device. The three-dimensional tag may include three or more bi-chromal spheres. The image may be received at a processor of the computing device, or may be received at a computing system over a network.

At 2004, the method 2000 may include receiving an identifier associated with the product. The identifier may be received from a computing device via an interface, may be automatically determined from the image, may be determined during manufacturing, or any combination thereof.

At 2006, the method 2000 may include detecting the three-dimensional tag within the image. The tag may be detected based on edge detection, blob detection, shape detection, other detection techniques, or any combination thereof.

At 2008, the method 2000 can include determining a signature based on the three-dimensional tag. As discussed above, the signature may be determined from a plurality of characteristics determined from the spheres of the tag from the image data. Other embodiments are also possible. At 2010, the method 2000 can include storing the signature and the identifier in a database.

Figure 21:
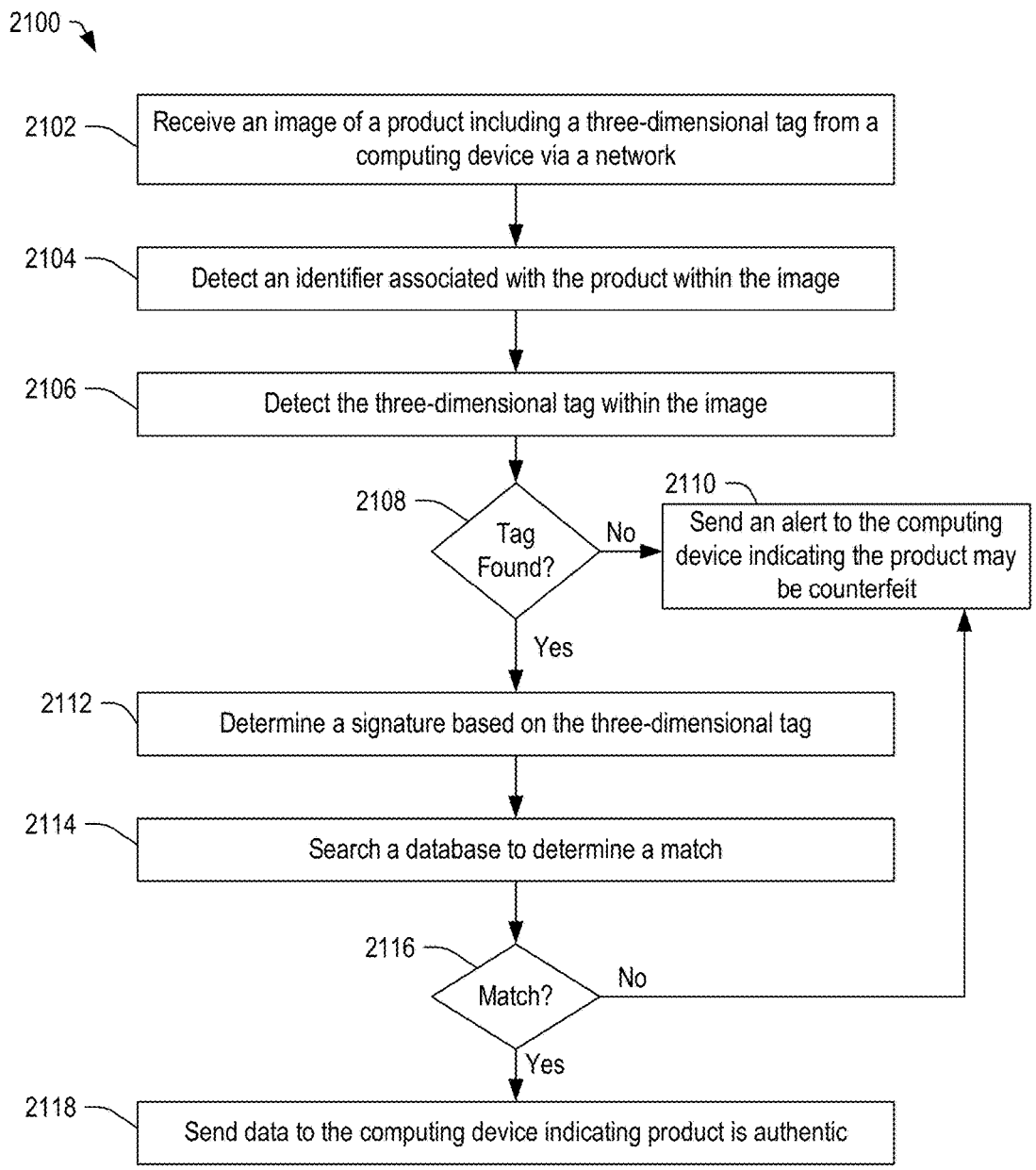
FIG. 21 depicts a flow diagram of a method of authenticating a product based on an image of a tag, in accordance with certain embodiments of the present disclosure.

FIG. 21 depicts a flow diagram of a method 2100 of authenticating a product based on an image of a tag, in accordance with certain embodiments of the present disclosure. At 2102, the method 2100 may include receiving an image of a product including a three-dimensional tag from a computing device via a network. At 2104, the method 2100 may include detecting an identifier associated with the product within the image.

At 2106, the method 2100 can include detecting the three-dimensional tag within the image. At 2108, if the tag is not found, the method 2100 can include sending an alert to the computing device indicating the product may be counterfeit, at 2110.

Returning to 2108, if the tag is found, the method 2100 may include determining a signature based on the three-dimensional tag, at 2112. As discussed above, the signature may be determined from a plurality of characteristics related to the plurality of three-dimensional objects, including the azimuth angle, the elevation angle, distance between objects, color ratio variations, imperfections of the objects, other characteristics, or any combination thereof.

At 2114, the method 2100 may include searching a database to determine a match. In an example, the system may search the database based on the signature determined from the tag. If, at 2116, a match is not determined, the method 2100 may include sending an alert to the computing device indicating the product may be counterfeit, at 2110. Otherwise, at 2116, if a match is found, the method 2100 can include sending data to the computing device indicating that the product is authentic, at 2118. Other embodiments are also possible.

In some embodiments, the devices, systems, and methods described above with respect to FIGS. 1A-21 may include a method for making an authentication and identification security tag. The method can include preparing an appropriate tag base substrate (which may be part of the product itself); selecting a specific number of bi-chromal spheres; and disbursing these spheres either onto the tag base or into a retaining structure in such a manner that their respective three dimensional orientations are substantially random and statistically independent. The method may further include encapsulating the array of structures in a transparent medium to produce a tag that can be attached to a product. In some embodiments, the method may also include imprinting a fiducial mark on or near the tag to indicate a first sphere for the purpose of determining the signature. Further, in some embodiments, the method may also include printing a number representing the unique signature onto at least a portion of the tag. In some embodiments, a bar code or other identifier may be imprinted on the tag itself. In an example, the bar code or other identifier may be produced on the tag encapsulant top or on a bottom surface. Other embodiments are also possible.

Further, the devices, systems, and methods described above with respect to FIGS. 1A-21 may include a method for utilizing an authentication and identification security tag. The method can include, during production, imaging the tag, processing the image to obtain a device signature, and recording the device signature in a secure database, together with the lot number, serial number or other number associated with the product. In some embodiments, the method may also include imprinting an identifier (such as the lot number, serial number, or device signature number) on the tag. The method can further include imaging the tag a second time, possibly at another time, in another location and with a different imaging system. The method may also include processing the second image to obtain a device signature. In a first embodiment, the authentication process may optionally include encrypting the device signature, comparing the signature obtained from the second image with the signature obtained from the first image (taking into account the encryption used), and making a decision as to whether or not the device signature matches the with the lot number, serial number or other number associated with the product which has been archived in the secure database. Alternatively, the authentication process may include determining a signature associated with the tag and comparing the signature with a signature value printed or stamped on the tag.

In some embodiments, the devices, systems and methods described above with respect to FIGS. 1A-21 may include imaging the tag, processing the image to obtain a device signature, encrypting the device signature, and recording the encrypted device signature by printing it on the product or tag itself. Subsequently, the method may include imaging the tag a second time, possibly at another time, in another location and with a different imaging system. The method may include processing the second image to obtain a device signature, optionally reading the encrypted device signature printed on the product or tag itself to recover the original device signature without disclosing this information to the user, encrypting the device signature, comparing the encrypted signature obtained from the second image with the encrypted signature printed on the tag or product, and making a decision as to whether or not the encrypted device signature matches the encrypted signature printed on the product or tag.

Some of the products that can be protected with the disclosed tag disclosure include but are not limited to integrated circuit (IC) chips, analog and digital electrical components; apparel, such as shoes, clothing, hand-bags, watches, and other wearables; devices, such as smartphones, smartwatches, computers, digital players, and other devices; car parts, such as brakes, mufflers, motors, and other parts; airplane parts, such as fans, turbines, flops, and other components; consumable products, such as wine bottles, cheese packages, meat packages, and other items; medical products, such as hip implants, other implantable objects; and medicine, such as medicine bottles, blister packs, pills, and other medical devices or medicines.

For applications where the tag needs to withstand high temperatures such as, for example, a tag attached to an IC chip that is flow soldered, the material of the spheres can be selected to have a melt temperature in excess of the flow solder temperature, so that the spheres can withstand the flow solder temperature. For example, Zirconium-based bi-chromal spheres can be configured to withstand temperatures above 1000 degrees Celsius.

In some embodiments, modifications can be made to the design of the bi-chromal spheres to make them suitable for different applications where optical imaging is not practical. For example, a dual-property sphere can be used, where one part of the sphere is coated with material that is more or less transparent to x-rays, such as beryllium and copper. In another example, the sphere can be formed such that it is partially conductive and partially non-conductive, which can make it easier to image with scanning electron or ion beam microscopes. In another example, the sphere can be partially magnetic and partially non-magnetic, which may make it easier to image with a scanning magnetic microscope. In another example, the dual-property objects can be nanometers in size, for example 1 nm to 100 nm, as long as there is an instrument that can image the dual-property objects and distinguish between the two or more properties of the object.

In conjunction with the devices, methods and systems described above with respect to FIGS. 1A-21, a plurality of dual-property three-dimensional shapes can be used for product authentication or for product identification, but it is not limited to these applications. The dual-property can include two colors, two material characteristics, two electrical characteristics, two magnetic characteristics, or any combination thereof. Further, the dual properties and manufacturing variations may be used to determine a statistically unique signature. The foregoing describes example embodiments for fabricating and using three dimensional bi-chromal structures, and in particular for protection against counterfeiting. Although the foregoing discussion has presented specific embodiments, persons skilled in the art will recognize that changes may be made in form and detail without departing from the spirit and scope of the embodiments. Accordingly, the specific embodiments described herein should be understood as examples and not limiting the scope thereof. Further, while the methods of the present disclosure are described in relation to certain apparatus shown in the drawings attached hereto, the present disclosure is equally applicable to all other kinds of systems for recognizing counterfeit or fake parts based on the concept described herein.

Further, while the above-discussion has focused on bi-chromal spheres and the use of optical sensors (such as cameras) to detect the orientation of such spheres, this disclosure is not so limited. In certain embodiments, the three-dimensional objects may be formed from different materials having detectable properties that can be used to determine the orientation of the object. Such properties may include, but are not limited to, conductive properties, insulative properties, x-ray transmissible or opaque properties, While embodiments of the disclosure have been shown and described, modifications thereof can be made by one skilled in the art without departing from the spirit and teachings of the disclosure. The embodiments described and the examples provided herein are exemplary only, and are not intended to be limiting. Many variations and modifications of the disclosure disclosed herein are possible and are within the scope of the disclosure. Accordingly, other embodiments are within the scope of the following claims. The scope of protection is not limited by the description set out above.

Although the present disclosure has been described with reference to preferred embodiments, workers skilled in the art will recognize that changes may be made in form and detail without departing from the scope of the disclosure.

What is claimed is:

1. An apparatus comprising:
a tag including:
an encapsulant; and
a plurality of bichromal objects randomly disposed within the encapsulant to define at least one statistically unique signature.

2. The apparatus of claim 1, wherein the at least one statistically unique signature is determined from angular orientation characteristics of each of the plurality of bichromal objects.

3. The apparatus of claim 1, wherein the at least one statistically unique signature is determined from relative positions of the plurality of bichromal objects within the encapsulant.

4. The apparatus of claim 1, wherein the at least one statistically unique signature is determined from a defect characteristic of at least one of the plurality of bichromal objects.

5. The apparatus of claim 1, wherein the at least one statistically unique signature is determined from a combination of orientation data, spacing data, color data, size data, and defect data associated with each of the plurality of bichromal objects individually and relative to one another.

6. The apparatus of claim 1, wherein the at least one statistically unique signature is determined from at least one of a distance between each of the plurality of three-dimensional objects, an angle between each of the plurality of three-dimensional objects, and a centroid of a group of the plurality of three-dimensional objects.

7. The apparatus of claim 1, wherein the plurality of three-dimensional objects comprises a pre-determined number of bi-chromal spheres.

8. The apparatus of claim 1, wherein:
the tag further includes a substrate coupled to the encapsulant and configured to adhere to a surface of a product; and
the at least one statistically unique signature uniquely identifies the product.

9. The apparatus of claim 1, wherein the encapsulant comprises a clear epoxy responsive to at least one of ultraviolet light, curing time, and heat to cure the clear epoxy to secure the plurality of bichromal objects.

10. An apparatus comprising:
a tag including:
a plurality of bichromal objects;
a clear epoxy configured to secure the plurality of bichromal objects in a random distribution and random relative orientations defining at least one statistically unique signature.

11. The apparatus of claim 10, wherein each of the plurality of bichromal objects comprises a Janus sphere having a first hemisphere having a first color and a second hemisphere having a second color.

12. The apparatus of claim 10, wherein:
each of the plurality of bichromal objects comprises a first portion having a first property and a second portion having a second property; and
the first property and the second property are detectable to determine the at least one statistically unique signature.

13. The apparatus of claim 12, wherein the first portion includes at least one of beryllium and copper and the first property is more transparent to x-rays and wherein the second portion includes a material that is less transparent to x-rays.

14. The apparatus of claim 10, wherein each of the plurality of three-dimensional objects has a diameter of approximately 500 microns or less.

15. The apparatus of claim 10, wherein the statistically unique signature is determined, at least in part, based on at least one of an orientation characteristic, a spacing characteristic, a color characteristic, a size characteristic, and a defect characteristic associated with each of the plurality of bichromal objects individually and relative to one another.

16. An apparatus comprising:
a tag including:
an encapsulant,
a pre-determined number of three-dimensional objects randomly distributed and randomly oriented within the encapsulant to define at least one statistically unique signature, one or more of the pre-determined number of three-dimensional objects having at least two colors rendering the one or more objects bi-chromal.

17. The apparatus of claim 16, wherein:
wherein an orientation characteristic is determined from at least one color of the bi-chromal object.

18. The apparatus of claim 16, wherein the at least one statistically unique signature is determined from a plurality of characteristics including at least one of an angular orientation characteristic, a size characteristic, a shape characteristics, a color characteristic, and a defect characteristic, a spacing characteristic between the pre-determined number of three-dimensional objects, an angular relationship between the pre-determined number of three-dimensional objects, a defect of one or more the pre-determined number of three-dimensional objects, and a centroid of a group of the plurality of three-dimensional objects.

19. The apparatus of claim 16, wherein the encapsulant material comprises a clear epoxy cured by exposure to at least one of an ultraviolet light source, a curing time, and a heat source.

20. The apparatus of claim 16, wherein the tag further includes an adhesive surface configured to adhere the tag to a product.

21. An apparatus comprising:
a product; and
a tag coupled to the product, the tag including:
an encapsulant; and a pre-determined number of bi-chromal spheres randomly oriented within the encapsulant and having a plurality of characteristics detectable to determine at least one statistically unique signature to identify the product.

22. The apparatus of claim 21, wherein the plurality of characteristics include at least one of an orientation characteristic, a size characteristic, a spacing characteristic, an imperfection characteristic, a color characteristic, an electrical property, and a magnetic property.

23. The apparatus of claim 21, wherein the tag further includes a base coupled to the encapsulant and to the product.

* * * * *